US012346518B2

(12) United States Patent
Wang et al.

(10) Patent No.: US 12,346,518 B2
(45) Date of Patent: Jul. 1, 2025

(54) TOUCH/CONTROL STRUCTURE, AND TOUCH-CONTROL DISPLAY PANEL, AND DISPLAY APPARATUS

(71) Applicants: Chengdu BOE Optoelectronics Technology Co., Ltd., Sichuan (CN); BOE Technology Group Co. Ltd., Beijing (CN)

(72) Inventors: Siyu Wang, Beijing (CN); Wei Wang, Beijing (CN); Yang Zeng, Beijing (CN); Junxiu Dai, Beijing (CN); Tianci Chen, Beijing (CN); Yi Zhang, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/694,454

(22) PCT Filed: Feb. 28, 2023

(86) PCT No.: PCT/CN2023/078844
§ 371 (c)(1),
(2) Date: Mar. 22, 2024

(87) PCT Pub. No.: WO2024/178645
PCT Pub. Date: Sep. 6, 2024

(65) Prior Publication Data
US 2024/0393900 A1    Nov. 28, 2024

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0443* (2019.05);
(Continued)

(58) Field of Classification Search
CPC .................. G06F 3/044–0448; G06F 3/04146
See application file for complete search history.

(56) References Cited

U.S. PATENT DOCUMENTS 10,318,055 B2 *   6/2019   Ye ........................ G06F 3/04164
10,991,771 B2 *   4/2021   Kim ..................... H10K 50/844
(Continued)

FOREIGN PATENT DOCUMENTS

CN      106371666 A     2/2017
CN      111522463 A     8/2020
(Continued)

OTHER PUBLICATIONS

Written Opinion from PCT/CN2023/078844 dated Jun. 23, 2023.
International Search Report from PCT/CN2023/078844 dated Jun. 23, 2023.

*Primary Examiner* — Patrick F Marinelli
(74) *Attorney, Agent, or Firm* — Calfee, Halter & Griswold LLP

(57) ABSTRACT

A touch-control structure includes touch-control electrodes located in a touch-control region. The touch-control electrodes are connected to a binding portion through lead wires located in a peripheral region. The touch-control electrodes include first and second touch-control electrodes. The first touch-control electrodes extend along the first direction and are distributed at intervals along the second direction; the second touch-control electrodes extend along the second direction and are distributed at intervals along the first direction. The first and second touch-control electrodes are insulated. The lead wires include first and second lead wires, the first and second touch-control electrodes are connected to the binding portion through the first and second lead wires, respectively. At least a part of the first lead wires includes a main body portion and a narrowing portion. A
(Continued)

cross section of at least part of the narrowing portion is smaller than a cross section of the main body portion.

16 Claims, 12 Drawing Sheets

(52) U.S. Cl.
CPC .. *G06F 3/0446* (2019.05); *G06F 2203/04111* (2013.01); *G06F 2203/04112* (2013.01)

(56) References Cited

U.S. PATENT DOCUMENTS

| | | | | |
|---|---|---|---|---|
| 11,508,788 B2* | 11/2022 | Kim | ................ | H10K 50/844 |
| 11,871,639 B2* | 1/2024 | Kim | ................ | H10K 59/40 |
| 12,124,661 B2* | 10/2024 | Zeng | ................ | G09G 3/32 |
| 12,171,132 B2* | 12/2024 | Kim | ................ | G06F 3/04164 |
| 2014/0184950 A1* | 7/2014 | Chu | ................ | G06F 3/0446 |
| | | | | 349/12 |
| 2018/0182822 A1* | 6/2018 | Seo | ................ | G06F 3/0412 |
| 2018/0308903 A1* | 10/2018 | Jeong | ................ | G06F 3/04164 |
| 2018/0373377 A1* | 12/2018 | Ye | ................ | G06F 3/04164 |
| 2021/0366998 A1* | 11/2021 | Kim | ................ | H10K 59/40 |
| 2022/0308697 A1* | 9/2022 | Liu | ................ | G06F 3/0443 |
| 2023/0063211 A1* | 3/2023 | Kim | ................ | H10K 59/131 |
| 2023/0418422 A1* | 12/2023 | Zeng | ................ | G06F 3/0412 |
| 2024/0045541 A1* | 2/2024 | Zhang | ................ | G09F 19/22 |
| 2024/0099096 A1* | 3/2024 | Kim | ................ | G06F 3/0412 |
| 2024/0353950 A1* | 10/2024 | Wen | ................ | G06F 3/0412 |
| 2024/0353962 A1* | 10/2024 | Tong | ................ | G06F 3/0445 |
| 2024/0393900 A1* | 11/2024 | Wang | ................ | G06F 3/04164 |
| 2024/0402859 A1* | 12/2024 | Zeng | ................ | G06F 3/0412 |

FOREIGN PATENT DOCUMENTS

| | | |
|---|---|---|
| CN | 111831155 A | 10/2020 |
| CN | 113552970 A | 10/2021 |
| CN | 113986045 A | 1/2022 |
| CN | 115129183 A | 9/2022 |
| CN | 115268708 A | 11/2022 |

* cited by examiner

TOUCH/CONTROL STRUCTURE, AND TOUCH-CONTROL DISPLAY PANEL, AND DISPLAY APPARATUS

CROSS REFERENCE TO RELATED APPLICATIONS

The present application is based upon International Application No. PCT/CN2023/078844, filed on Feb. 28, 2023, and the entire contents of which are incorporated herein by reference.

TECHNICAL FIELD

The present disclosure relates to the field of touch-control technology, and in particular, to a touch-control structure, a touch-control display panel and a display apparatus.

BACKGROUND

Touch-control display panels have been widely used in terminal devices such as mobile phones and tablet computers. While displaying images, human-computer interaction can be realized through touch-control operations. The touch-control position can be determined by sensing capacitance change, so as to achieve touch-control operations. However, the touch-control accuracy of the current touch-control display panel is low.

It should be noted that the information disclosed in the above background part is only used to enhance understanding of the background of the present disclosure, and therefore may include information that does not constitute related art known to those of ordinary skill in the art.

SUMMARY

According to the present disclosure, there is provided a touch-control structure, a touch-control display panel and a display apparatus.

According to an aspect of the present disclosure, there is provided a touch-control structure. The touch-control structure is provided with a touch-control region and a peripheral region outside the touch-control region. The peripheral region includes an edge region surrounding the touch-control region and a lead-out region extending outward from a part of the edge region, and the lead-out region is provided with a binding portion;

the touch-control structure includes touch-control electrodes located in the touch-control region and lead wires located in the peripheral region, and the touch-control electrodes are connected to the binding portion through the lead wires; the touch-control electrodes include a plurality of first touch-control electrodes and a plurality of second touch-control electrodes; the first touch-control electrodes extend along a first direction and are distributed at intervals along a second direction; the second touch-control electrodes extend along the second direction and are distributed at intervals along the first direction; the first direction is intersected with the second direction; the first touch-control electrodes are insulated from the second touch-control electrodes; the lead wires include a plurality of first lead wires and a plurality of second lead wires; the first touch-control electrodes are connected to the binding portion through the first lead wires, and the second touch-control electrodes are connected to the binding portion through the second lead wires;

at least a part of the first lead wires includes main body portions and narrowing portions connected to each other along an extension path of the first lead wires, and a cross section of at least a part of the narrowing portions is smaller than a cross section of the main body portions.

In some embodiments of the present disclosure, the lead wires include a plurality of layers of wire bodies provided at intervals, and the wire bodies of a same lead wire overlap with each other; a part of the wire bodies of at a least part of the first lead wires is provided with a fracture;

wire bodies cut off by the fracture includes a plurality of wire segments separated by the fracture, and the wire segments are all connected to adjacent wire bodies through contact holes, so as to connect the wire bodies cut off by the fracture to adjacent wire bodies in parallel;

a part of the first lead wires corresponding to the wire segments is the main body portions; and a part of the first lead wires between two contact holes connected to two ends of a same fracture is the narrowing portions.

In some embodiments of the present disclosure, the touch-control structure further includes dummy wire bodies, the dummy wire bodies are located within the fracture, and the dummy wire bodies are provided at a same layer as the wire bodies where the fracture is located, and are connected floatingly to the wire bodies where the fracture is located.

In some embodiments of the present disclosure, a distance between a contact hole and a fracture closest to the contact hole is greater than a length of the fracture.

In some embodiments of the present disclosure, a distance between a contact hole and a fracture closest to the contact hole is less than or equal to a length of the fracture.

In some embodiments of the present disclosure, at least two first lead wires with different lengths are provided with narrowing portions; among two first lead wires with different lengths, a length of a narrowing portion of a first lead wire with a greater length is smaller than a length of a narrowing portion of the first lead wire with a smaller length.

In some embodiments of the present disclosure, the narrowing portions are all located in the edge region, and a distance between each of the narrowing portions and the lead-out region in the second direction is equal to each other.

In some embodiments of the present disclosure, the narrowing portions are all located in the edge region; a distance between each of the narrowing portions and the lead-out region in the second direction is increased or decreased along a direction away from the touch-control region.

In some embodiments of the present disclosure, the lead-out region and the touch-control region are distributed along the second direction; each of the first lead wires is connected to the first touch-control electrodes from a same side of the touch-control region, and is distributed at intervals along a direction away from the touch-control region;

each of the first lead wires is classified into a first type of lead wire, a second type of lead wire or a third type of lead wire distributed along the direction away from the touch-control region; a partial region of the first type of lead wire extends along the first direction between the touch-control region and the lead-out region; the narrowing portions are provided at the second type of lead wire; a length of the third type of lead wire is greater than a length of the second type of lead wire, and is greater than or equal to a length of the first type of lead wire.

In some embodiments of the present disclosure, the lead-out region and the touch-control region are distributed along the second direction; each of the first lead wires is connected to the first touch-control electrodes from a same side of the touch-control region, and is distributed at intervals along a direction away from the touch-control region;

each of the first lead wires is classified into a first type of lead wire, a second type of lead wire or a third type of lead wire distributed in the direction away from the touch-control region; a partial region of the first type of lead wire extends along the first direction between the touch-control region and the lead-out region; the narrowing portions are provided at the first type of lead wire and the second type of lead wire; a length of the third type of lead wire is greater than a length of the second type of lead wire, and is greater than or equal to a length of the first type of lead wire.

In some embodiments of the present disclosure, the lead-out region and the touch-control region are distributed along the second direction; each of the first lead wires is connected to the first touch-control electrodes from a same side of the touch-control region, and is distributed at intervals along a direction away from the touch-control region; the second lead wires are located between the touch-control region and the binding portion;

at least one of the first lead wires is intersected with and insulated from at least one of the second lead wires.

In some embodiments of the present disclosure, an outline of the touch-control region includes four sides and rounded corners connecting two adjacent sides; the sides include a first side and a second side extending along the first direction, as well as a third side and a fourth side extending along the second direction; the first side and the second side are distributed along a direction away from the lead-out region; the third side and the fourth side are distributed along the first direction; a rounded corner connecting the first side and the third side is a first rounded corner;

In the direction away from the lead-out region, a first one of the first touch-control electrodes is a first target electrode, an edge of the first target electrode close to the lead-out region is located at the first side, and an edge of the first target electrode away from an end of the fourth side is located at the first rounded corner; a first lead wire connected to the first target electrode is a first target lead wire;

In a direction extending away from the third side to the fourth side, a first one of the second touch-control electrodes is a second target electrode, and an edge of the second target electrode away from the fourth side is located at the third side, and an edge of the second target electrode close to an end of the lead-out region is located at the first rounded corner; a second lead wire connected to the second target electrode is a second target lead wire;

the first target lead wire is intersected with and insulated from the second target lead wire.

In some embodiments of the present disclosure, at least one isolation wire is provided between at least a local region of the first target lead wire and at least a local region of the second target lead wire.

In some embodiments of the present disclosure, a dummy lead wire is provided between the at least one isolation wire and a local region of the second target lead wire.

In some embodiments of the present disclosure, the wire bodies of the lead wires include a first wire body and a second wire body;

a first touch-control electrode includes a plurality of first electrode blocks connected in series along the first direction; a second touch-control electrode includes a plurality of second electrode blocks distributed along the second direction and transfer bridges connecting two adjacent second electrode blocks; a transfer bridge is intersected with a first touch-control electrode;

the transfer bridges are provided on a same layer as the first wire body; the first electrode blocks, the second electrode blocks and the second wire body are provided on a same layer.

In some embodiments of the present disclosure, the touch-control structure includes:

a first conductive layer, including the first wire body and the transfer bridges;

an insulating isolation layer, covering the first conductive layer; and a second conductive layer, provided on a surface of the insulating isolation layer away from the first conductive layer, and including the first electrode blocks, the second electrode blocks and the second wire body.

In some embodiments of the present disclosure, the lead wires further include a plurality of third lead wires; the second touch-control electrodes are further connected to the binding portion through the third lead wires; and an end of a third lead wire is connected to an end of a second touch-control electrode away from the lead-out region, and another end of the third lead wire is connected to the binding portion.

According to an aspect of the present disclosure, there is provided a touch-control display panel, including:

a display substrate; and the touch-control structure described according to any one of the above, provided on a side of the display substrate.

According to an aspect of the present disclosure, there is provided a touch-control display panel, including:

a driving backplane;

a plurality of light-emitting devices, provided on a side of the driving backplane;

an encapsulation layer, covering each of the light-emitting devices; and a touch-control structure, provided on a surface of the encapsulation layer away from the driving backplane; where the touch-control structure includes a touch-control region and a peripheral region outside the touch-control region; the peripheral region includes an edge region surrounding the touch-control region and a lead-out region extending outward from a part of the edge region; the lead-out region is provided with a binding portion; and the touch-control structure includes a plurality of lead wires located in the peripheral region;

at least one of the lead wires includes a first wire body and a second wire body; orthographic projections of the first wire body and the second wire body on the driving backplane overlap with each other, and the first wire body and the second wire body are connected in parallel;

the first wire body includes at least one discontinuous portion, and the first wire body is divided by the discontinuous portion into a plurality of first lead wire sub-portions;

the second wire body includes at least one continuous lead wire sub-portion, and an orthographic projection of the continuous lead wire sub-portion on the driving backplane is a continuous structure; and orthographic projections of the discontinuous portion and the continuous lead wire sub-portion on the driving backplane overlap with each other.

In some embodiments of the present disclosure, the plurality of lead wires includes a first type of lead wire and a second type of lead wire distributed in the peripheral region along a direction away from the touch-control region; a length of the first type of lead wire is greater than or equal to a length of the second type of lead wire;

the second type of lead wire includes the first wire body and the second wire body;

the first type of lead wire includes a third wire body and a fourth wire body connected in parallel; orthographic projections of the third wire body and the fourth wire body on the driving backplane are continuous structures, and the orthographic projections overlap with each other.

In some embodiments of the present disclosure, the plurality of lead wires further includes a third type of lead wire, and the third type of lead wire is provided on a side of the second type of lead wire away from the touch-control region; a length of the third type of lead wire is greater than or equal to the length of the second type of lead wire; the third type of lead wire includes a fifth wire body and a sixth wire body connected in parallel; orthographic projections of the fifth wire body and the sixth wire body on the driving backplane are continuous structures, and the orthographic projections overlap with each other.

According to an aspect of the present disclosure, there is provided a display apparatus, including the touch-control display panel described in any one of the above.

It should be understood that the foregoing general description and the following detailed description are exemplary and explanatory only, and do not limit the present disclosure.

BRIEF DESCRIPTION OF THE DRAWINGS

The accompanying drawings, which are incorporated in and constitute a part of the description, illustrate embodiments consistent with the disclosure and together with the description serve to explain the principles of the disclosure. Obviously, the drawings in the following description are some embodiments of the present disclosure, and for those of ordinary skill in the art, other drawings can also be obtained from these drawings without creative efforts.

DETAILED DESCRIPTION

Figure 1:
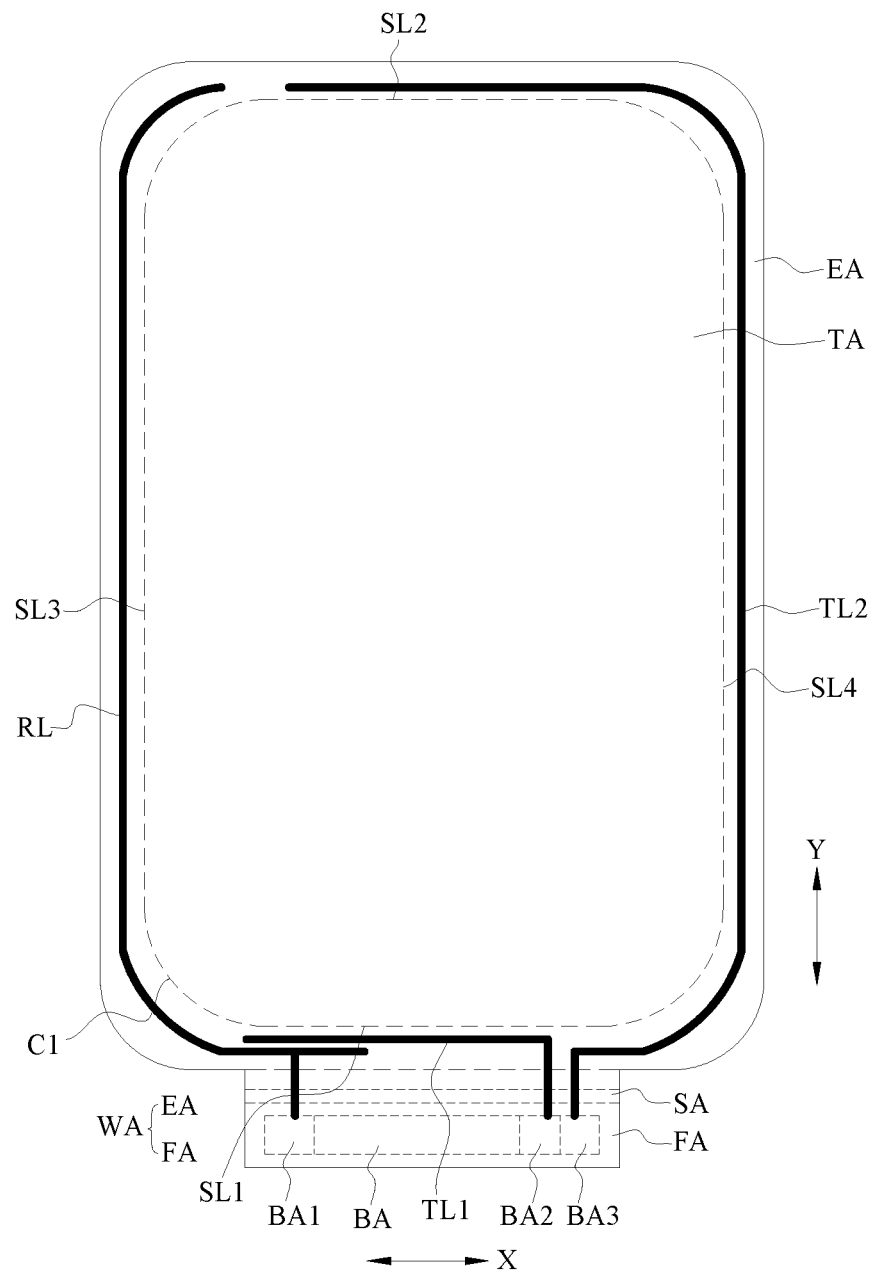
FIG. 1 is a schematic diagram of various regions of a touch-control structure according to some embodiments of the present disclosure.

Example embodiments will now be described more fully with reference to the accompanying drawings. Example embodiments, however, can be implemented in various forms and should not be construed as limited to the embodiments set forth here; by contrast, these embodiments are provided so that the present disclosure will be thorough and complete, and will fully convey the concept of example embodiments to those skilled in the art. The same reference numerals in the drawings denote the same or similar structures, and thus their detailed descriptions will be omitted. Furthermore, the drawings are merely schematic illustrations of the present disclosure and are not necessarily drawn to scale.

The terms "a", "an", "the", "said" and "at least one" are used to indicate the presence of one or more elements/components/etc.; the terms "comprising" and "including" are used to indicate the meaning of an open inclusion, and refers to that there may be additional elements/components/etc. in addition to the listed elements/components/etc.; the terms "first", "second" and "third" etc. are only used as a marker, not a limit on the number of its object.

In the context, "A" overlapping with "B" means that there is an overlapping region between the orthographic projection of "A" and the orthographic projection of "B" on the same plane, which is not limited to complete overlapping and may refer to partial overlapping.

In the context, "A" and "B" being provided on the same layer means that "A" and "B" are different regions of the same film layer. "A" and "B" may extend along the same plane, or may be located on two different planes.

In the related art, a touch-control display panel can be divided into a display region and a peripheral region outside the display region. The touch-control display panel includes a display substrate and a touch-control layer provided on a side of the display substrate. The touch-control layer includes a plurality of touch-control electrodes for sensing touch-control operations, and the touch-control electrodes are located in the display region. At the same time, in order to transmit signals, the peripheral region is provided with lead wires connected to the touch-control electrodes. These lead wires are connected to a binding portion in the peripheral region, through which the touch-control display panel can be connected to the control chip or the peripheral driving circuit board, so as to transmit touch-control signals. However, due to different positions of the touch-control electrodes, the lengths of the lead wires connecting different touch-control electrodes and the binding portion are different, resulting in large differences in the loads of different lead wires, poor uniformity, and large differences in signal impedance, thus easily affecting the accuracy of touch-control. In some embodiments, paths of the lead wires can be extended by winding so as to make the lengths of different lead wires consistent. However, due to the limited space in the peripheral region, the wiring space of the lead wires is limited; and there is at least a part of the lead wires, for which it is difficult to perform winding, so the accuracy of touch-control still needs to be improved.

Figure 2:
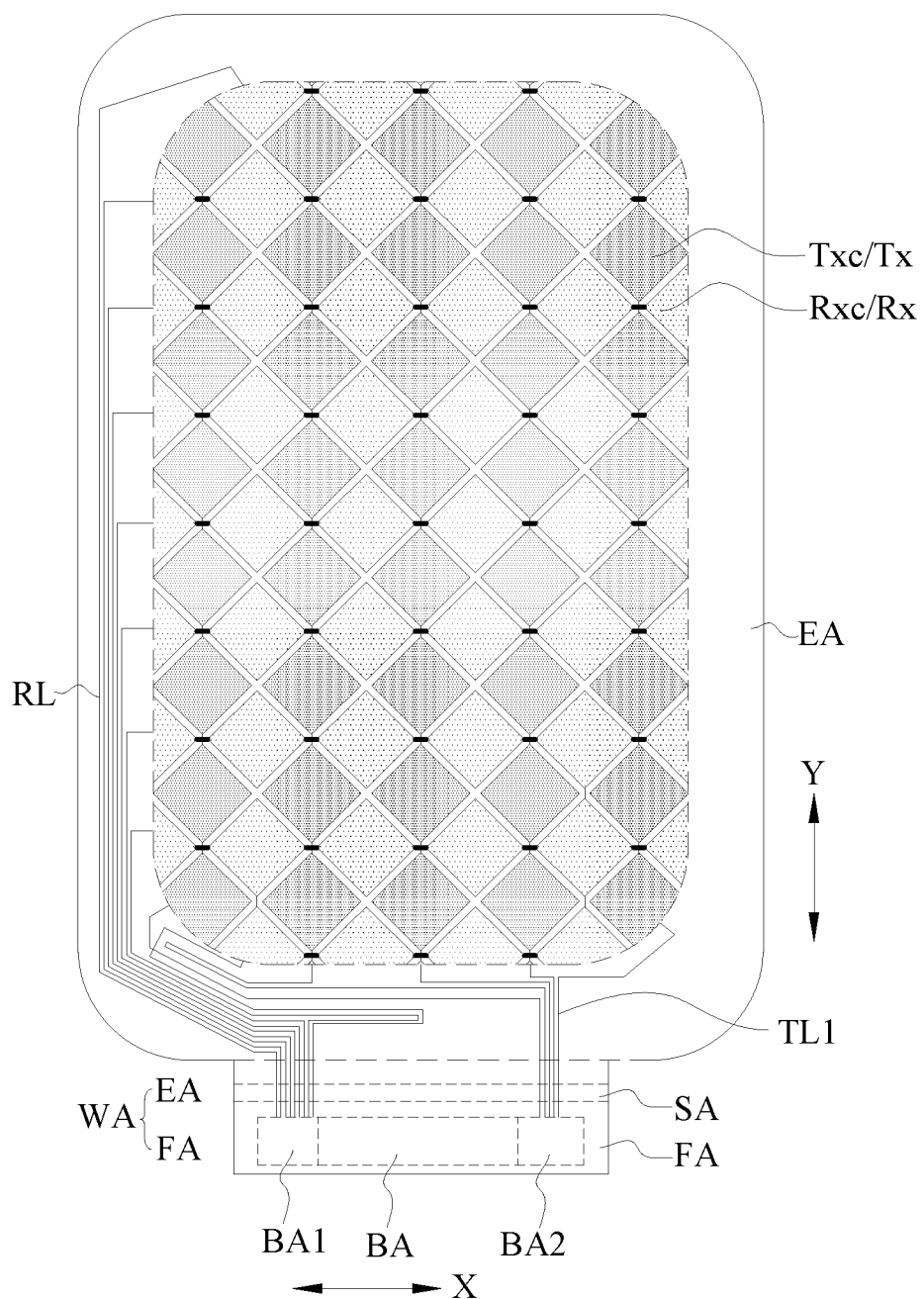
FIG. 2 is a top view of a touch-control structure according to some embodiments of the present disclosure.
Figure 3:
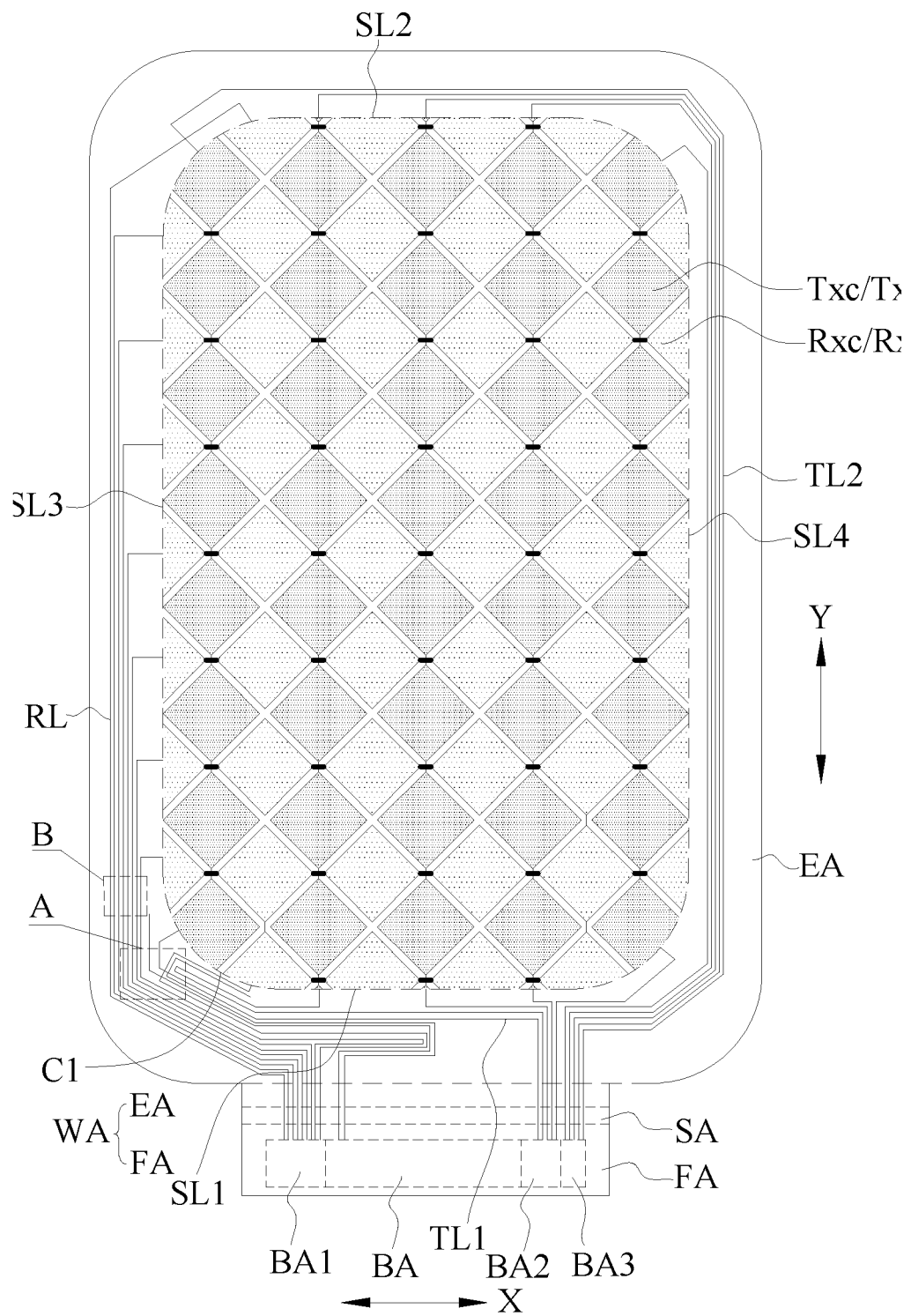
FIG. 3 is a top view of a touch-control structure according to another embodiment of the present disclosure.

Based on the above solutions, according to embodiments of the present disclosure, there is provided a touch-control structure, which can be provided on a display substrate to form a touch-control display panel and realize human-computer interaction. As shown in FIG. 1 to FIG. 3, the touch-control structure can be at least divided into a touch-control region TA and a peripheral region WA. The peripheral region WA is located outside the touch-control region TA. The peripheral region WA can include an edge region EA surrounding the touch-control region TA and a lead-out region FA extending outward from a part of the edge region EA. The lead-out region FA is provided with a binding portion BA.

The touch-control structure may include touch-control electrodes located in the touch-control region TA and lead wires located in the peripheral region WA. Each touch-control electrode is connected to the binding portion BA through at least one lead wire, so as to transmit signals. The touch-control electrodes may include a plurality of first touch-control electrodes Rx and a plurality of second touch-control electrodes Tx. The first touch-control electrodes Rx extend along the first direction X and are distributed at intervals along the second direction Y; the second touch-control electrodes Tx extend along the second direction Y and are distributed at intervals along the first direction X; the first direction X is intersected with the second direction Y; the first touch-control electrodes Rx are insulated form the second touch-control electrodes Tx; the lead wires include a plurality of first lead wires RL and a plurality of the second lead wire TL1, the first touch-control electrodes Rx are connected to the binding portion BA through the first lead wires RL, and the second touch-control electrode Tx are connected to the binding portion BA through the second lead wires TL1.

It should be noted that the first direction X and the second direction Y in the context only refer to two directions that are intersected with each other. For example, they are perpendicular to each other. Although the first direction X shown in the drawings is transverse and the second direction Y is longitudinal, they are not limited to this. The first direction and the second direction Y may be other directions; or, the first direction and the second direction Y may be interchanged with each other; and those skilled in the art may know that as the touch-control structure rotates, the actual orientations of the first direction X and the second direction Y may change.

As shown in FIG. 6 to FIG. 13, at least a part of the first lead wires RL includes main body portions RLm and narrowing portions RLs connected to each other along the extension path of the first lead wires RL. The cross section of at least a part of the narrowing portions RLs is smaller than the cross section of the main body portions RLm.

The touch-control structure according to embodiments of the present disclosure may transmit the driving signal to the second touch-control electrode Tx through the binding portion BA and the second lead wire TL1, receive the sensing signal through the first touch-control electrode Rx and the first lead wire RL, and determine the touch-control position based on changes produced by the driving signal through the sensing signal. In some embodiments, the first touch-control electrode Rx and the first lead wire RL may also be used to transmit the driving signal, while the second lead wire TL1 and the second touch-control electrode Tx may be used to transmit the sensing signal, so as to determine the touch-control position in the same way. Thus, the touch-control function may be realized through the touch-control structure.

In the above touch-control structure, the cross section of at least a part of the first lead wires RL is narrowed, that is, there is a narrowing portion RLs with a cross section smaller than the cross section of main portion RLm, so that the resistance of the first lead wire RL where the narrowing portion RLs is located can be increased through the narrowing portion RLs, without increasing the length. In a case that the space of the peripheral region WA is limited, it is still possible to increase the resistance uniformity of each first lead wire RL by increasing the resistance of a part of the first lead wires RL, so as to avoid affecting the accuracy of touch-control due to excessive differences in resistance of different first lead wires RL.

The touch-control structure according to the present disclosure is described in detail below:

As shown in FIG. 1 to FIG. 3, the touch-control structure may be divided into a touch-control region TA and a peripheral region WA. The touch-control region TA is used to sense touch-control operations, and the peripheral region WA may be a region surrounding the touch-control region TA. At the same time, the peripheral region WA may include an edge region EA and a lead-out region FA. The edge region EA may be provided to surround the touch-control region TA, and the lead-out region FA may extend outward from a part of the edge region EA. In addition, the lead-out region FA may be provided with a binding portion BA, which may be connected to a driving chip or an external circuit board for transmitting driving signals and sensing signals for realizing the touch-control function.

Figure 4:
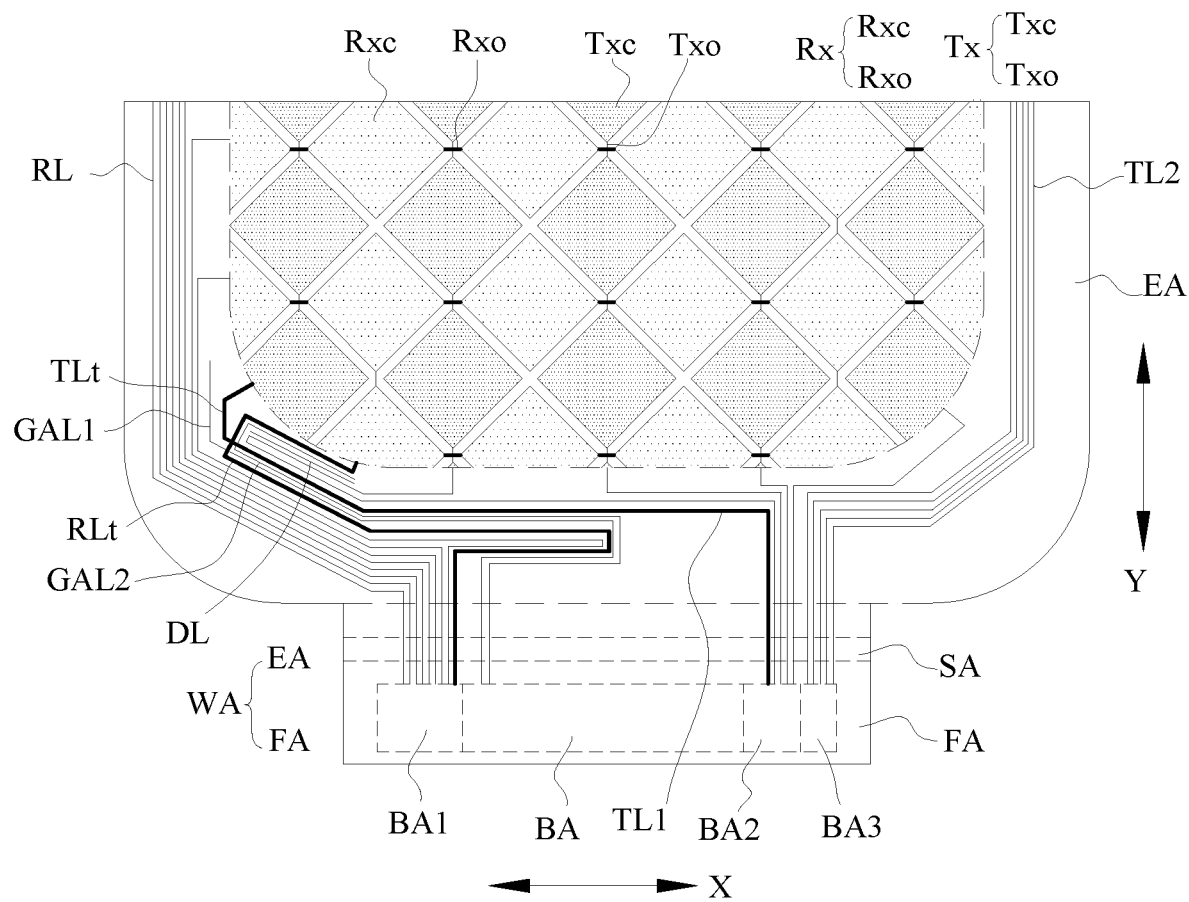
FIG. 4 is local view of FIG. 3.

The touch-control structure according to the present disclosure may adopt a mutual capacitance structure. As shown in FIG. 2 to FIG. 4, a plurality of touch-control electrodes may be provided in the touch-control region TA. The touch-control electrodes may include a plurality of first touch-control electrodes and a plurality of second touch-control electrodes Tx that are insulated from each other.

As shown in FIG. 4, any first touch-control electrode Rx may extend along the first direction X, and various first touch-control electrodes Rx may be distributed at intervals along the second direction Y At the same time, any second touch-control electrode Tx may extend along the second direction Y, and various second touch-control electrodes Tx may be distributed at intervals along the first direction X. Each first touch-control electrode Rx is intersected with various second touch-control electrode Tx, and each second touch-control electrode Tx is intersected with various first touch-control electrodes Rx, but the first touch-control electrode Rx and the second touch-control electrode Tx intersected with each other are insulated from each other.

When realizing the touch-control function, a driving signal may be input to the second touch-control electrode Tx, and a capacitance may be generated between the first touch-control electrode Rx and the second touch-control electrode Tx. When the touch-control region TA is touched, the capacitance at the touch position changes, and the touch-control position may be determined by detecting the sensing signal of the first touch-control electrode Rx.

In some embodiments of the present disclosure, as shown in FIG. 4, each first touch-control electrode Rx and each second touch-control electrode Tx may be both formed by a plurality of electrode blocks connected in series.

A first touch-control electrode Rx may include a plurality of first electrode blocks Rxc connected in series along the first direction X. Two adjacent first electrode blocks Rxc may be connected to each other through a connecting portion CP, which is provided on the same layer as the first electrode block Rxc. The outline of the first electrode block Rxc may be a polygon such as a rhombus, or may be other shapes.

A second touch-control electrode Tx may include a plurality of second electrode blocks Txc distributed along the second direction Y and a transfer bridge BR connecting two adjacent second electrode blocks Txc, where the outline of the second electrode block Txc may be a polygon such as a rhombus, or may be other shapes, and the shape of the second electrode block Txc may be the same as that of the first electrode block Rxc. The transfer bridge BR is located on a different layer form the second electrode block Txc, and can be connected to the second electrode block Txc through a via hole. The second electrode block Txc is provided on the same layer as the first electrode block Rxc. Since the transfer bridge BR is located on a different layer from the first electrode block Rxc and the second electrode block Txc, the transfer bridge BR may be intersected with, but do not contact the connection portion CP in space, thus realizing that the first touch-control electrode Rx and the second touch-control electrode block Txc are intersected with each other and insulated from each other.

Furthermore, in the same second touch-control electrode Tx, the number of the transfer bridges BR connecting two adjacent second electrode blocks Txc may be one or more. If there are a plurality of transfer bridges BR, the plurality of transfer bridges BR may be distributed along the first direction X side by side, and all intersected with the same connecting portion CP in space.

As shown in FIG. 7 to FIG. 9, FIG. 11, FIG. 13 and FIG. 16, the touch-control structure may include a first conductive layer TMA, an insulating isolation layer TLD and a second conductive layer TMB.

The first conductive layer TMA may include a transfer bridge BR of the second touch-control electrode Tx. The first conductive layer TMA may have a single-layer or multi-layer structure. For example, the first conductive layer TMA may include two outer layers and a middle layer located between the two outer layers; the material of the outer layer may be titanium, and the material of the middle layer may be aluminum; that is, the first conductive layer TMA has a Ti/Al/Ti structure. Alternatively, the material of the outer layer may be indium tin oxide (ITO), and the material of the middle layer may be aluminum; that is, the first conductive layer TMA has an ITO/Al/ITO structure.

The insulating isolation layer TLD covers the first conductive layer TMA, and the material of the insulating isolation layer TLD may be silicon nitride. In some embodiments, it may also be other inorganic insulating materials or organic insulating materials such as silicon oxide, silicon oxynitride, etc.

The second conductive layer TMB may be provided on a surface of the insulating isolation layer away from the first conductive layer TMA, and the second conductive layer TMB may include a first electrode block Rxc and a second electrode block Txc. The second conductive layer TMB may have a single-layer or multi-layer structure. If it has a multi-layer structure, the second conductive layer TMB may also have the above-mentioned Ti/Al/Ti structure or ITO/Al/ITO structure.

In some embodiments of the present disclosure, as shown in FIG. 7 to FIG. 9, FIG. 11, FIG. 13, and FIG. 16, the touch-control structure may further include a buffer layer TBU and a protecting layer TOC, where the buffer layer TBU may serve as the substrate of the touch-control structure, and the material of the buffer layer TBU may include an insulating material such as silicon nitride and silicon oxide. The first conductive layer TMA may be provided on a side of the buffer layer TBU, and the protecting layer TOC may cover the second conductive layer TMB. The protecting layer TOC is used to protect the second conductive layer TMB, and the material of the protecting layer TOC may be a transparent insulating material such as polyimide (PI) or optical glue.

The first touch-control electrode Rx and the second touch-control electrode Tx may each have a mesh structure formed by a plurality of grid lines. The mesh structure has a plurality of meshes, and each mesh is surrounded by a plurality of mesh lines.

In other embodiments of the present disclosure, the transfer bridge BR in the above embodiments may also be located on the second conductive layer TMB, and the first electrode block Rxc and the second electrode block Txc may also be located on the first conductive layer TMA.

As shown in FIG. 2 to FIG. 4, in order to facilitate signal transmission of the first touch-control electrode Rx and the second touch-control electrode Tx, the first touch-control electrode Rx and the second touch-control electrode Tx may be connected to the binding portion BA through a plurality of lead wires. Among them, each lead wire may include a plurality of first lead wires RL and a plurality of second lead wires TL1. Each first lead wire RL may be connected to each first touch-control electrode Rx in one-to-one correspondence, and the first lead wires RL are all connected to the binding portion BA, so that the signal may be transmitted between the binding portion BA and the first touch-control electrode Rx. Each second lead wire TL1 may be connected to each second touch-control electrode Tx in one-to-one correspondence, and the second lead wires TL1 are all connected to the binding portion BA, so that the signal may be transmitted between the binding portion BA and the second touch-control electrode Tx. The binding portion BA may include a plurality of pads, and a lead wire L may be connected to a pad.

Furthermore, as shown in FIG. 1 to FIG. 3, the lead-out region FA and the touch-control region TA may be distributed along the second direction Y. Each first lead wire RL may be connected to each first touch-control electrode Rx from a same side of the touch-control region TA, and distributed at intervals along a direction away from the touch-control region TA, so as to avoid short circuit between adjacent first lead wires RL. Each second lead wire TL1 may be located between the touch-control region TA and the binding portion BA, and connected to an end of each second touch-control electrode Tx close to the lead-out region FA. At least one first lead wire RL may be intersected with and insulated from at least one second lead wire TL1.

The outline of the touch-control region TA may be defined by the edges of each first touch-control electrode Rx and each second touch-control electrode Tx in the first direction X and the second direction Y; that is, opposite edges of two first touch-control electrodes Rx farthest away from each other and opposite edges of two second touch-control electrodes Tx farthest away from each other form the edges of the touch-control region TA, and these edges and their extension lines may form the outline of the touch-control region TA.

In some embodiments of the present disclosure, as shown in FIG. 1 and FIG. 3, the outline of the touch-control region TA may be a rounded rectangle, which may include four sides and rounded corners connecting two adjacent sides. The various sides include a first side SL1 to a fourth side SL4. The first side SL1 and the second side SL2 may extend along the first direction X, and be distributed along a direction away from the lead-out region FA. The second side SL2 is located on the side of the first side SL i away from the lead-out region FA. The third side SL3 and the fourth side SL4 may extend along the second direction Y, and be distributed along the first direction X. Among them, the rounded corner connecting the first side SL1 and the third side SL3 may be defined as the first rounded corner C1. The first lead wire RL may be connected to the first touch-control electrode Rx from a side of the third side SL3 and the first rounded corner C1 away from the fourth side SL4. The second lead wire TL1 may be connected to each second touch-control electrode Tx from a side of the first side SL1 and the first rounded corner C1 away from the second side SL2.

Figure 5:
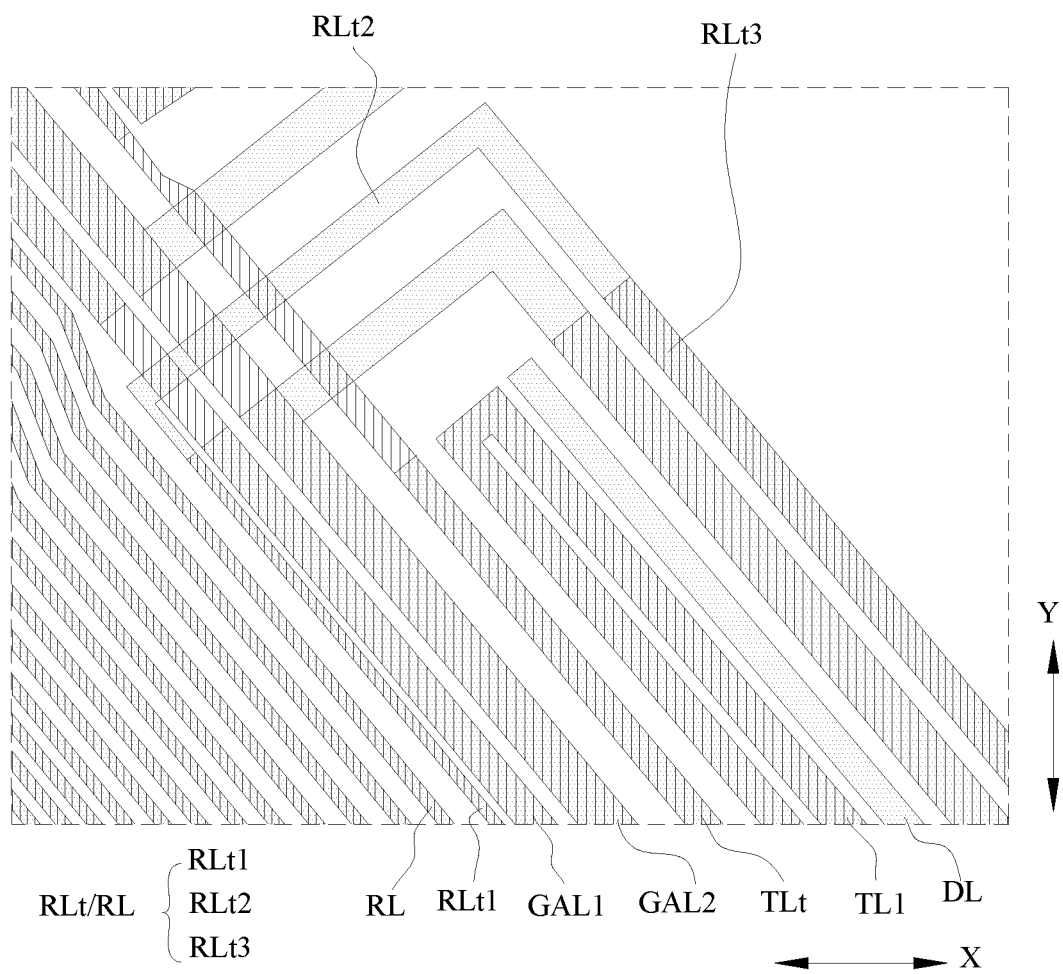
FIG. 5 is an enlarged view of part A in FIG. 3.

As shown in FIG. 3 to FIG. 5, in the direction away from the lead-out region FA, the first one of the first touch-control electrodes Rx is taken as the first target electrode, and the edge of the first target electrode close to the lead-out region FA is located on the first side SL1. The first lead wire RL connected to the first target electrode is the first target lead wire RLt, and the first lead wire RL connected to the second one of first touch-control electrodes Rx is located on the outer side of the first target lead wire RLt that is far away, and so on, the first lead wire RL connected to the nth first touch-control electrode Rx is located on the outer side of the first lead wire RL connected to the n-1th first touch-control electrodes Rx, and n is a positive integer greater than 2.

As shown in FIG. 3 to FIG. 5, in the direction away from the direction extending the third side SL3 to the fourth side SL4, the first one of second touch-control electrodes Tx is the second target electrode. The second lead wire TL1 connected to the second target electrode is the second target lead wire TLt. The second lead wire TL1 connected to the n-th second touch-control electrode Tx is located on the side of the first lead wire RL connected to the n-1th first touch-control electrode Rx close to the fourth side SL4, and n is a positive integer greater than 2.

As shown in FIG. 3 to FIG. 5, the edge of the end of the first target electrode away from the fourth side SL4 is located at the first rounded corner C1; that is, the edge of the end of the first target electrode away from the fourth side SL4 is a part of the first rounded corner C1. The edge of the end of the second target electrode close to the lead-out region FA is located at the first rounded corner C1; that is, the edge of the end of the second target electrode away from the fourth side SL4 is a part of the first rounded corner C1. That is to say, both the first target electrode and the second target electrode extend to the first rounded corner C1, so that the edge of the end of the second target electrode close to the lead-out region FA and the edge of the end of the first target electrode away from the fourth side SL4 are both located at the first rounded corner C1. At the same time, the edge of the second target electrode away from the fourth side SL4 is located on the third side SL3; that is, the edge of the second target electrode away from the fourth side SL4 is at least a part of the third side SL3. Therefore, the edge of the end of the second target electrode close to the lead-out region FA is located on the side away from the lead-out region FA of the edge of the end of the first target electrode away from the fourth side SL4.

As shown in FIG. 3 to FIG. 5, the binding portion BA may include a first binding region BA1 and a second binding region BA2 distributed along the first direction X, the first lead wires RL are all connected to the first binding region BA1, and the second lead wires TL1 are all connected to the second binding region BA2. Furthermore, the first binding region BA1 and the second binding region BA2 are located between the third side SL3 and the fourth side SL4, and the second binding region BA2 is located on the side of the first binding region BA1 away from the third side SL3. In order to be connected to the first target electrode and the second target electrode without short circuit, at least one first target lead wire RLt is intersected with and insulated from the second target lead wire TLt.

As shown in FIG. 3 to FIG. 5, at least one isolation wire is provided between at least a local region of the first target lead wire RLt and at least a local region of the second target lead wire TLt. The isolation wire may receive the same signal as that of the first target lead wire RLt or the second target lead wire TLt, such as a pulse signal with the same frequency; but the isolation wire is not connected to any touch-control electrode. Since the signal of the isolation wire is synchronized with the signal of the first target lead wire RLt or the second target lead wire TLt, there is no voltage difference between the isolation wire and the adjacent first target electrode or the second target electrode, which can prevent ion migration of the first target electrode or the second target electrode due to the voltage difference and avoid damage to the first target electrode or the second target electrode.

As shown in FIG. 5, the first target lead wire RLt may include a lead-out section RLt1, an intersecting section RLt2 and a connecting section RLt3. The lead-out section RLt1 extends from the binding portion BA to the edge region EA. The connecting section RLt3 and the lead-out section RLt1 are provided in the edge region EA side by side, and the connecting section RLt3 is located on the side of the lead-out section RLt1 close to the first rounded corner C1. The connecting section RLt3 is connected to the first target electrode. The intersecting section RLt2 is connected to the lead-out section RLt1 and the connecting section RLt3. The second target lead wire TLt is intersected with and insulated from the intersecting section RLt2, and is connected to the second target electrode.

There may be two isolation wires, including a first isolation wire GAL1 and a second isolation wire GAL2. The first isolation wire GAL1 is intersected with and insulated from the intersecting section RLt2. A part of the first isolation wire GAL1 is provided at intervals between the second target lead wire TLt and the lead-out section RLt1 of the first target lead wire RLt, and another part of the first isolation wire GAL1 is provided at intervals between the second target lead wire TLt and a first lead wire RL closest to the first target lead wire RLt. The second isolation wire GAL2 is located between the lead-out section RLt1 and the second target lead wire TLt, and between the first isolation wire GAL1 and the second target lead wire TLt. The second isolation wire GAL2 may also be divided into a plurality of sections, and includes three sections provided side by side with the lead-out section RLt1, the intersecting segment RLt2 and the connecting segment RLt3 respectively. By providing the first isolation wire GAL1 and the second isolation wire GAL2, the first target lead wire RLt, the second target lead wire TLt, and the first lead wire RL closest to the first target lead wire RLt can be protected.

Furthermore, in some embodiments of the present disclosure, a dummy lead wire DL may be provided between at least one isolation wire and a local region of the second target lead wire TLt. For example, the dummy lead wire DL may be provided between the second target lead wire TLt and a second shielding wire. The dummy lead wire DL is connected floatingly, and at least partially located on the same layer as various isolation wires and lead wires L, so as to improve the uniformity of the film layer.

In addition, in some embodiments of the present disclosure, as shown in FIG. 3 to FIG. 5, on the basis that the second lead wire TL1 is located between the touch-control region TA and the binding portion BA, various lead wires L further include a plurality of third lead wires TL2. The second touch-control electrode Tx is further connected to the binding portion BA through the third lead wire TL2, and one end of a third lead wire TL2 may be connected to an end of a second touch-control electrode Tx away from the lead-out region FA, and the other end of the third lead wire TL2 may be connected to the binding portion BA. That is to say, one end of the two ends of the same second touch-control electrode Tx in the second direction Y is connected to the binding portion BA through the second lead wire TL1, and the other end of the two ends of the same second touch-control electrode Tx in the second direction Y is connected to the binding portion BA through the third lead wire TL2. Furthermore, the binding portion BA may further include a third binding region BA3. The third binding region BA3, the second binding region BA2 and the first binding region BA1 are distributed along the first direction X; the third binding region BA3 is located on the side of the second binding region BA2 away from the first binding region BA1, and the third lead wire TL2 is connected to the third binding region BA3.

In other embodiments of the present disclosure, as shown in FIG. 2, the above-mentioned third lead wire TL2 may not be provided, and one end of the second lead wire TL1 may be connected to an end of a second touch-control electrode Tx away from the lead-out region FA, and the other end of the second lead wire TL1 may be connected to the binding portion BA. The end of the second touch-control electrode Tx close to the lead-out region FA is no longer directly connected to the binding portion BA.

Based on the above touch-control structure, as shown in FIG. 6 to FIG. 13, in order to improve the uniformity of the resistances of the first lead wires RL, the resistance of a part of the first lead wires RL is increased by reducing the cross section, so that the resistance of each first lead wire RL tends to be consistent. Specifically, at least a part of the first lead wires RL includes a main body portion RLm and a narrowing portion RLs connected to each other along its extension path. The cross section of the narrowing portion RLs is smaller than the cross section of the main body portion RLm, and the resistance is increased through the narrowing portion RLs.

The implementation of the first lead wire RL is exemplarily described below.

In some embodiments of the present disclosure, each lead wire L may have a multi-layer structure, which may include a plurality of layers of wire bodies provided at intervals, and two adjacent layers of wire bodies may be separated by an insulating material. Wire bodies of the same lead wire overlaps with each other and have a same extension path. Various wire bodies of the same lead wire L are connected in parallel, and a plurality of wire bodies forms a lead wire L to reduce the impedance. For a lead wire with a plurality of wire bodies connected in parallel, the cross section of the lead wire is the sum of the cross section of each wire body. In a case that the cross section of the wire body remains unchanged, the more the wire bodies are, the larger the cross section of the lead wire is, and the smaller the impedance is; on the contrary, the fewer the wire bodies are, the smaller the cross section of the lead wire is, and the greater the impedance is.

As shown in FIG. 6 to FIG. 13, a part of the wire bodies of at least a part of the first lead wires RL may be partially disconnected to form a fracture FR. Both ends of the fracture FR may be connected to wire bodies adjacent to the wire bodies where the fracture FR is located through the contact holes Ho; that is, the wire bodies at both ends of the fracture FR are connected in parallel to the adjacent wire bodies. In other word, the number of the fracture FR may be one or more. The wire body cut off by the fracture FR may include a plurality of wire segments separated by the fracture FR, and each wire segment may be connected to the adjacent wire body through the contact hole Ho, so that the wire body cut off by the fracture FR is connected in parallel to the adjacent wire body, thus the signal will pass through cross sections of different sizes during transmission in the lead wire L. The part of the first lead wire RL corresponding to the wire segment is the main body portion RLm, and the part of the first lead wire RL between two contact holes Ho connecting the two ends of a same fracture FR is the narrowing portion RLs.

Figure 8:
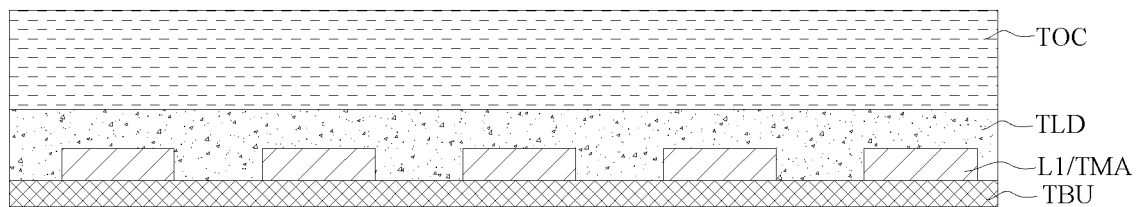
FIG. 8 is an F-F cross sectional view of FIG. 6.
Figure 9:
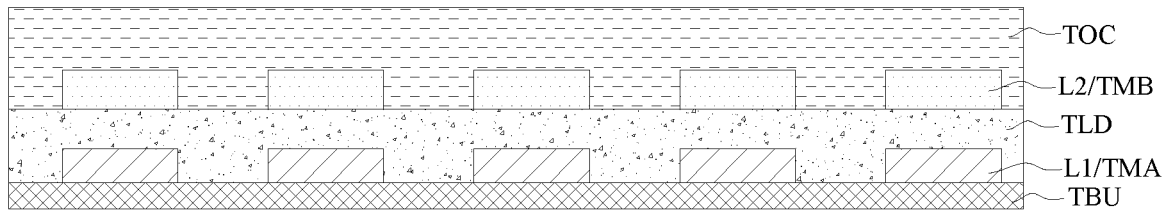
FIG. 9 is a G-G cross sectional view of FIG. 6.

In some embodiments, as shown in FIG. 6 to FIG. 9, a lead wire L is provided with two wire bodies, including a first wire body L1 and a second wire body L2. The first wire body L1 may be located on the first conductive layer TMA in the above embodiments. The second wire body L2 may be located on the second conductive layer TMB, and the contact hole Ho for achieving parallel connection of the wire bodies may penetrate the insulating isolation layer TLD. The fracture FR may be located at the second wire body L2. As shown in FIG. 8 and FIG. 9, due to the existence of the fracture FR, the area of the cross section of the narrowing portion RLs is the area of the cross section of the first wire body L1. The area of the cross section of the main body portion RLm is equal to the sum of the area of the cross section of the first wire body L1 and the area of the cross section of the second wire body L2.

At the intersection of the first target lead wire RLt and the second target lead wire TLt, the first wire body L1 of the first target lead wire RLt is disconnected, and the second wire body L2 of the first target lead wire RLt is continuous; the first wire body L1 of the second target lead wire TLt is disconnected, and the second wire body L2 of the second target lead wire TLt is continuous. The second wire body L2 of the second target lead wire TLt overlaps with the first wire body L1 of the first target lead wire RLt, which are separated by the insulating isolation layer TLD to achieve intersection and insulation between the two of them. For example, the intersecting section RLt2 of the first target lead wire RLt has a single-layer conductive structure, only including the second wire body L2; the second wire body L2 of the second target lead wire TLt is locally disconnected, thus locally forming a single-layer conductive structure where only the first wire body L1 is left. The intersection between the two single-layer conductive structures achieves intersection and insulation between the first target lead wire RLt and the second target lead wire TLt.

In addition, as shown in FIG. 5, the isolation wire may also have a multi-layer structure. Like the lead wire L, the isolation wire also includes a plurality of wire bodies. For example, the isolation wire includes two wire bodies, one wire body is located on the first conductive layer TMA, and the other wire body is located on the second conductive layer TMB, which are separated by the insulating isolation layer TLD. There is also an intersection between the second isolation wire GAL2 and the second target lead wire TLt, and the manner of the intersection may refer to the above-mentioned intersection between the first target lead wire RLt and the second target lead wire TLt. The wire body of the second isolation wire GAL2 located on the second conductive layer TMB is disconnected; and the wire body of the second isolation wire GAL2 located on the first conductive layer TMA is continuous, intersecting with the first wire body L1 of the second target lead wire TLt.

As shown in FIG. 5, the dummy lead wire DL may have e a single-layer or multi-layer structure, and may adopt the same structure as the lead wire L and the isolation wire. However, since the dummy lead wire DL does not intersect with other lead wires L, the dummy lead wire DL may be a continuous structure.

In other embodiments of the present disclosure, the first lead wire RL may have a single-layer structure. At least a part of the first lead wire RL may be thinned locally to form a narrowing portion RLs, and other regions may form the main body portion RLm, so that the resistance may be increased without increasing the length of the first lead wire RL.

Figure 10:
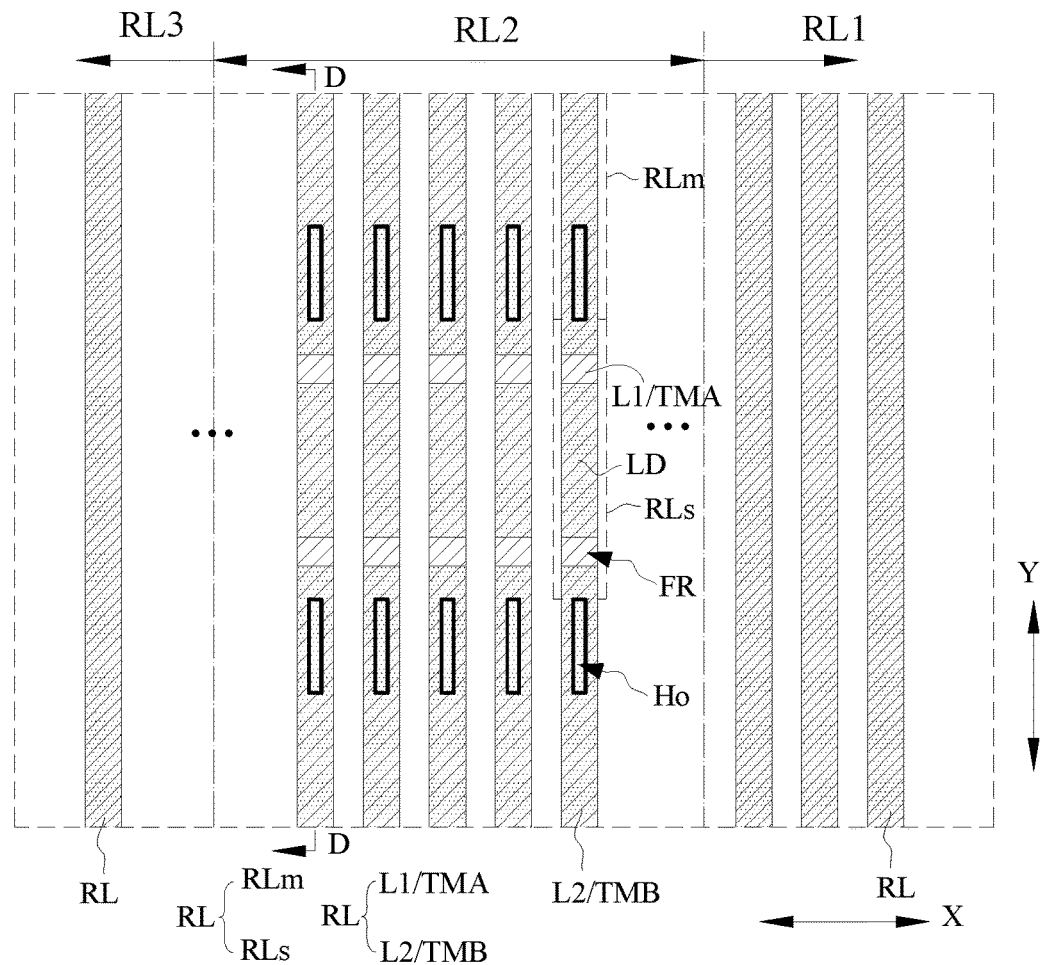
FIG. 10 is an enlarged view of part B in FIG. 3 according to some embodiments of the present disclosure.
Figure 11:
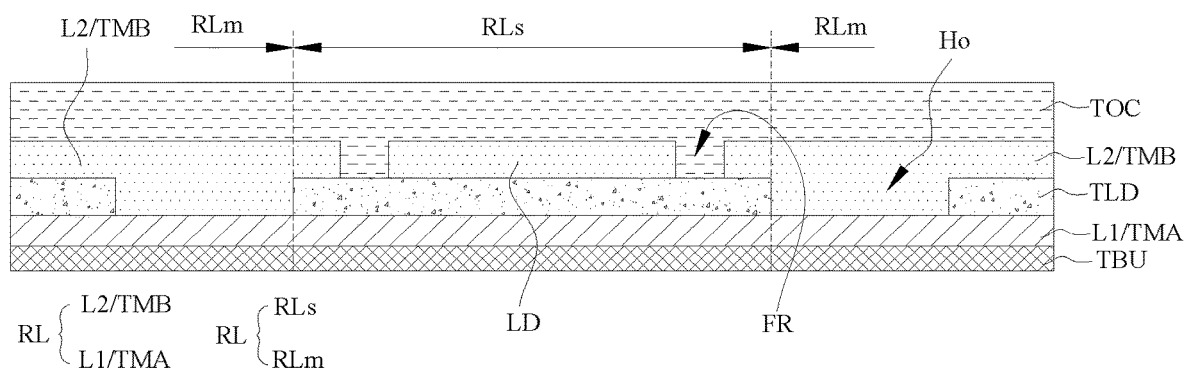
FIG. 11 is a D-D cross sectional view of FIG. 10.

In some embodiments of the present disclosure, as shown in FIG. 10 and FIG. 11, the touch-control structure may also include a dummy wire body LD, which may be located in the fracture FR. The dummy wire body LD is provided in the same layer as and connected floatingly to the wire body where the fracture FR is located. That is, the length of the dummy wire body LD in the extension direction of the first lead wire RL is smaller than the length of the fracture FR in the extension direction of the first lead wire RL, and the dummy wire body LD does not contact the two ends of the fracture FR. On the basis of keeping the fracture FR disconnected, the uniformity of the film layer may be improved through the dummy wire body LD. The width of the dummy wire body LD is the same as the width of the wire body where the fracture FR, where the dummy wire body LD is located, is located.

Figure 12:
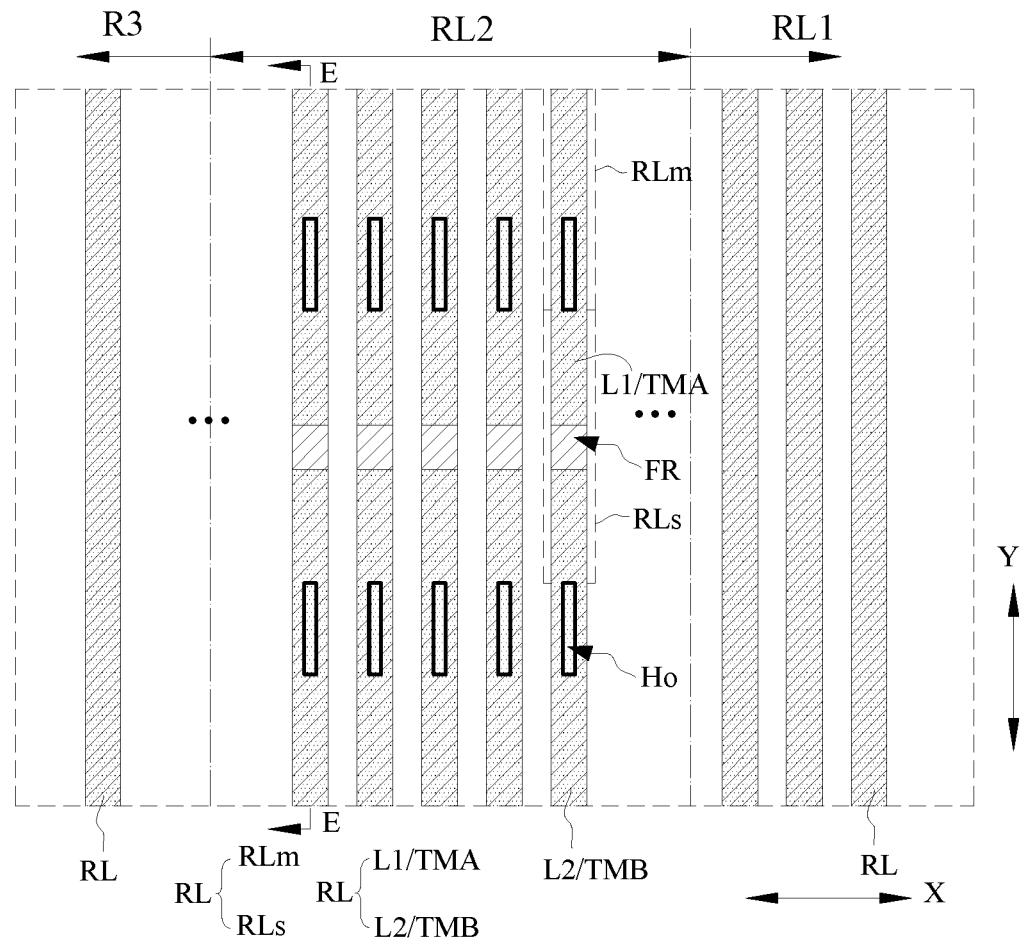
FIG. 12 is an enlarged view of part B in FIG. 3 according to some embodiments of the present disclosure.
Figure 13:
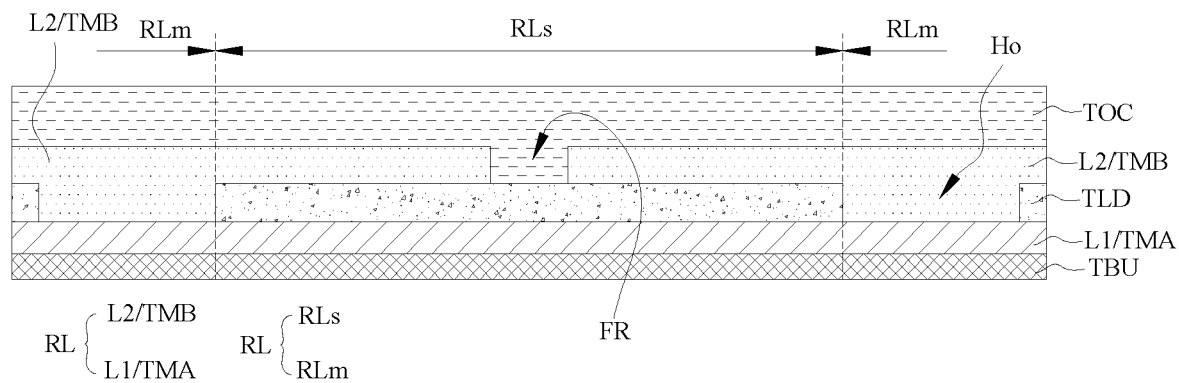
FIG. 13 is an E-E cross sectional view of FIG. 12.

In some embodiments of the present disclosure, as shown in FIG. 12 and FIG. 13, the distance between the contact hole Ho and the fracture FR nearest to the contact hole Ho is greater than the length of the fracture FR, where the distance between the contact hole Ho and the fracture FR can be defined as a distance between two closest points of the contact hole Ho and the fracture FR in the extension direction of the wire body. The length of the fracture FR may be the length of the fracture FR in the extension direction of the wire body. In this embodiment, there is a certain distance from the contact hole Ho at either end of the fracture FR to the fracture FR, thus the wire body may be extended as much as possible while ensuring that the fracture FR cuts off the wire body, so that the uniformity of the film layer may be improved without providing the dummy wire body LD. In some embodiments, the fracture surface FR may also be provided with a dummy wire body LD.

Figure 6:
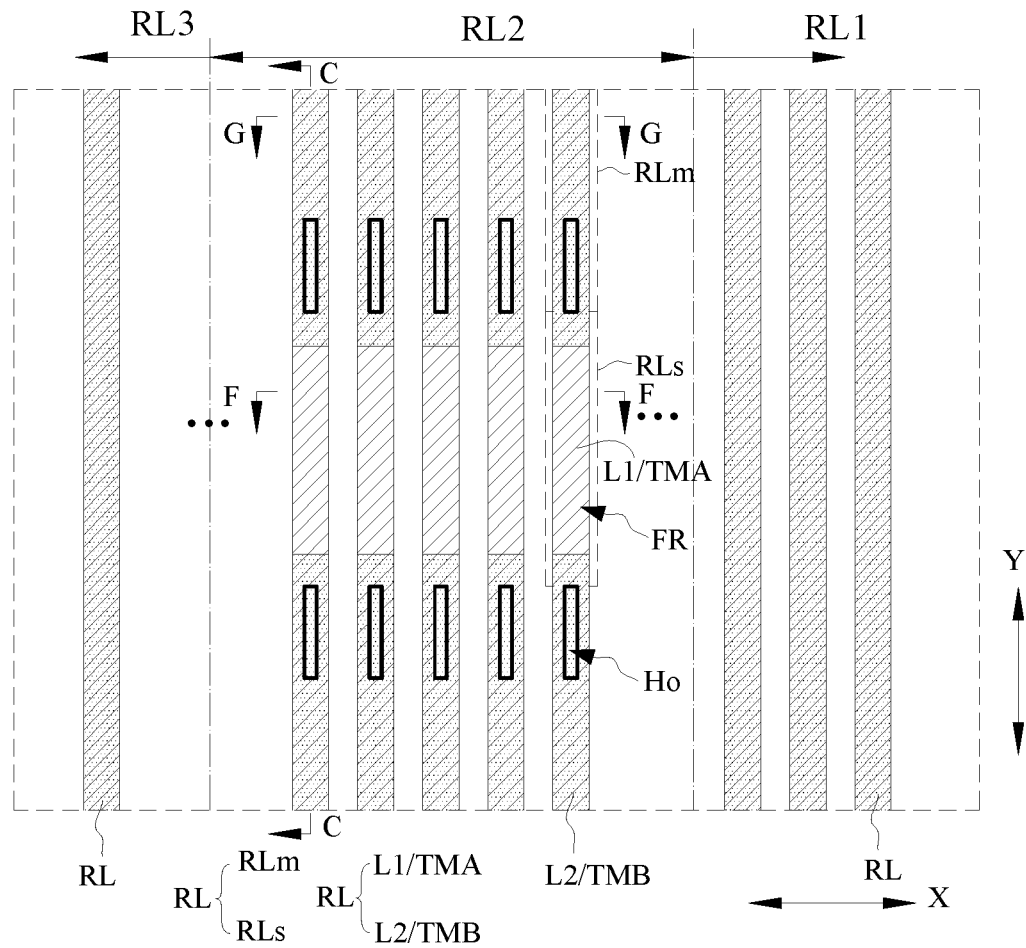
FIG. 6 is an enlarged view of part B in FIG. 3 according to a first embodiment.
Figure 7:
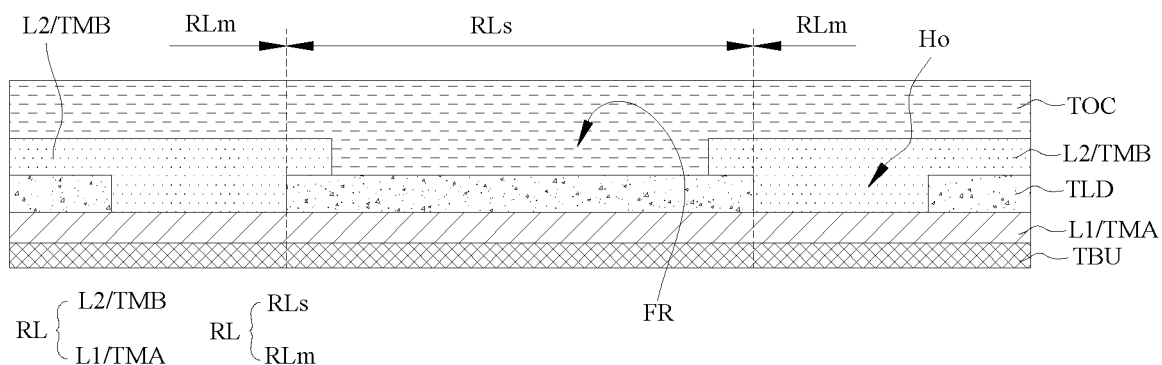
FIG. 7 is a C-C cross sectional view of FIG. 6.
Figure 15:
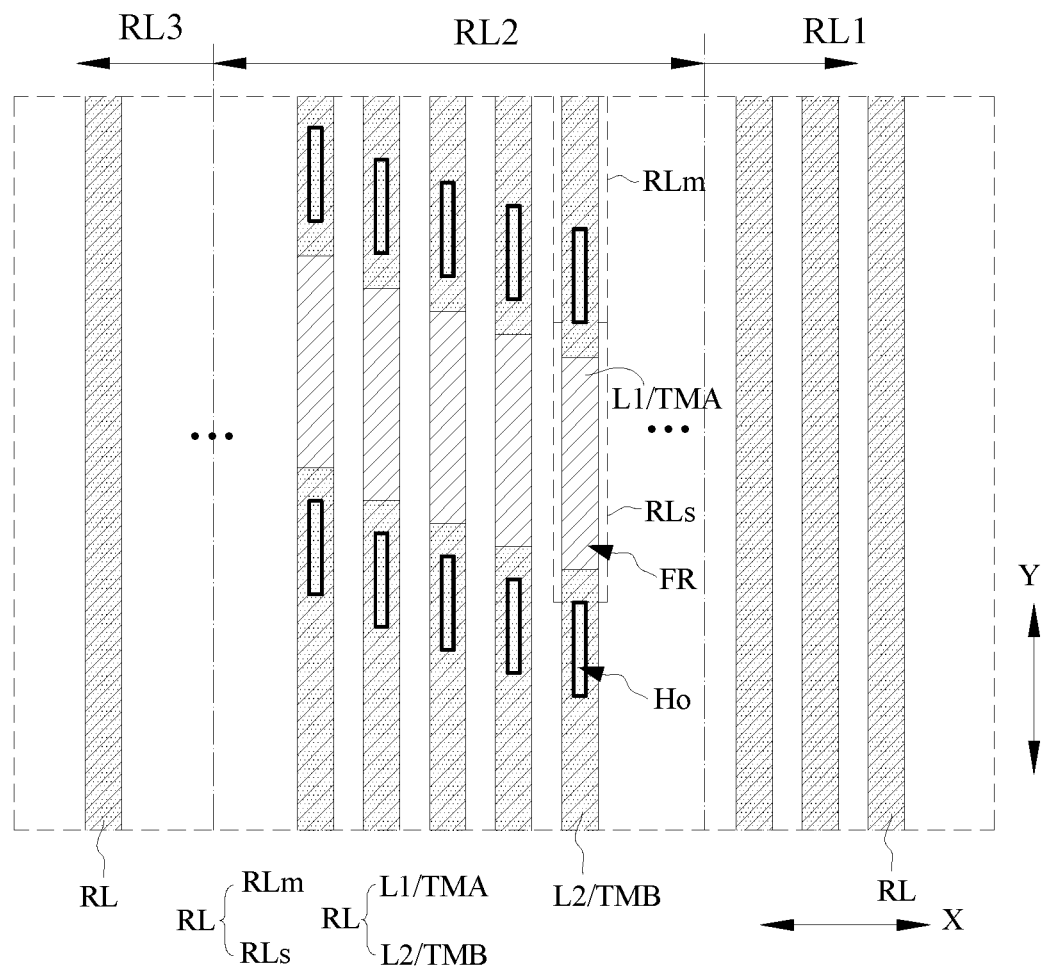
FIG. 15 is an enlarged view of part B in FIG. 3 according to some embodiments of the present disclosure.

In another embodiment of the present disclosure, as shown in FIG. 6, FIG. 10 and FIG. 15, the distance between the contact hole Ho and the fracture FR nearest to the contact hole Ho may also be less than or equal to the length of the fracture FR.

Figure 14:
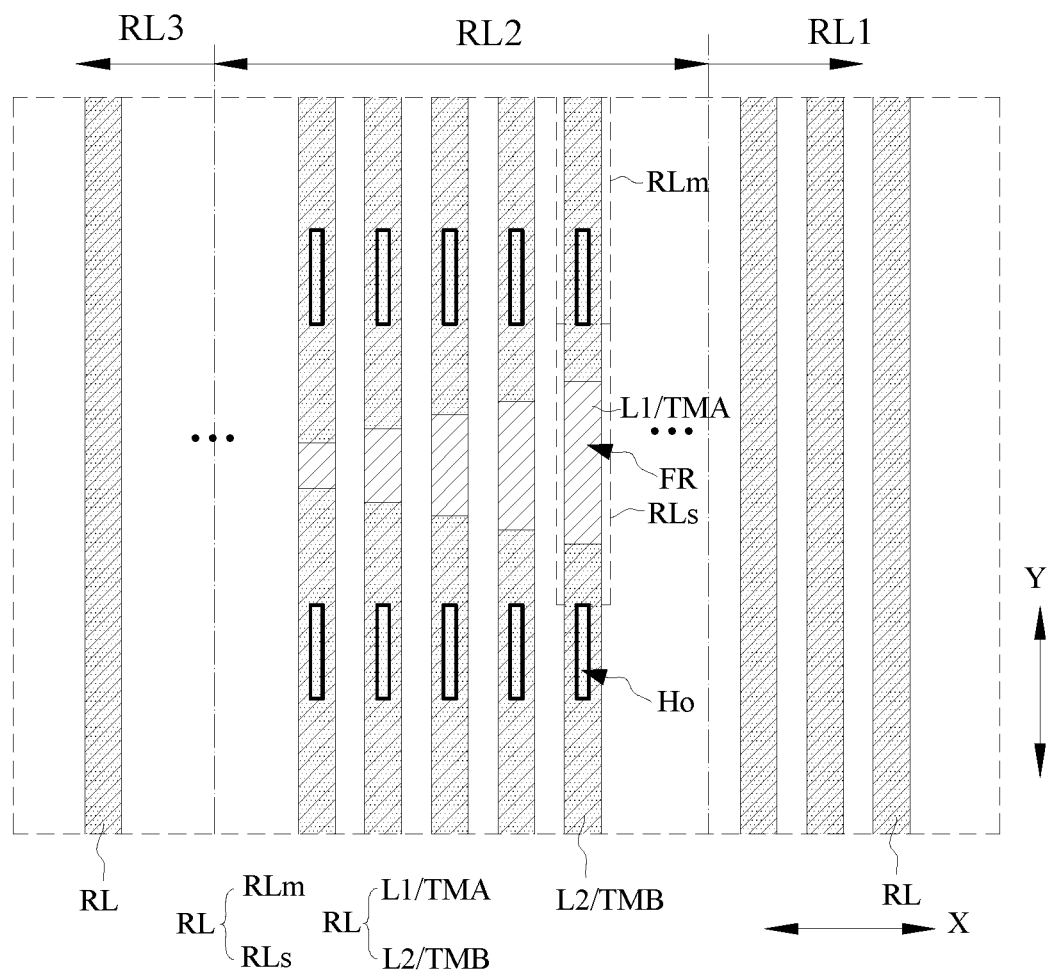
FIG. 14 is an enlarged view of part B in FIG. 3 according to some embodiments of the present disclosure.

In some embodiments of the present disclosure, in at least a part of the first lead wires RL, since different first lead wires RL have different lengths, correspondingly, their resistances are also different. When increasing the resistances through the narrowing portions RLs, the required increase amplitudes are different. Therefore, as shown in FIG. 14, among two first lead wires RL with different lengths, the length of the narrowing portion RLs of the first lead wire RL with a greater length may be smaller than the length of the narrowing portion RLs of the first lead wire RL with a smaller length, so that the resistances of the two first lead wires RL are consistent with each other.

In some embodiments of the present disclosure, as shown in FIG. 6 to FIG. 13, each narrowing portion RLs is located within the edge region EA, and the distance between each narrowing portion RLs and the lead-out region FA in the second direction Y is equal to each other.

In other embodiments of the present disclosure, as shown in FIG. 15, each narrowing portion RLs is located in the edge region EA. The distance between each narrowing portion RLs and the lead-out region FA in the second direction Y is increased along the direction away from the touch-control region TA. That is, the narrowing portion RLs that is farther away from the touch-control region TA, is also farther away from the lead-out region FA. In some embodiments, in other embodiments, the distance between each narrowing portion RLs and the lead-out region FA in the second direction Y is decreased in the direction away from the touch-control region TA.

In order to make the resistance of each first lead wire RL consistent to each other, not only the narrowing portion RLs may be provided, but also the length of the first lead wire RL may be extended by winding, thus increasing the resistance. In some embodiments of the present disclosure, these two methods may be used at the same time. The method of winding has a simple process, and the method of providing the narrowing portion RLs saves space. For example, as shown in FIG. 6 to FIG. 15, the various first lead wires RL may be divided into a first type of lead wire RL1, a second type of lead wire RL2 and a third type of lead wire RL3. The first type of lead wire RL1, the second type of lead wire RL2 and the third type of lead wire RL3 may be distributed sequentially along the direction away from the touch-control region TA.

As shown in FIG. 3 and FIG. 4, a partial region of the first type of lead wire RL1 extends between the touch-control region TA and the lead-out region FA along the first direction X, and extends at least to the region between the first binding region BA1 and the second binding region BA2, and then is connected to the first binding region BAL. Winding is realized by extending along the first direction X to increase the length of the first type of lead wire RL1. The first type of lead wire RL1 may not be provided with the narrowing portion RLs, the resistance of which may be increased only by winding. The first type of lead wires RL1 may include a plurality of first lead wires RL. For example, the number of first lead wires RL in the first type of lead wires RL1 is 10, and the 10 first lead wires RL are respectively connected to the first lead wires RL of the 1st to 10th first touch-control electrodes Rx in the direction away from the lead-out region FA.

In some embodiments, as shown in FIG. 4 and FIG. 5, a partial region of the second lead wire TL1 closest to the second target lead wire TLt (which is connected to the second lead wire TL1 of the second touch-control electrode Tx counted from the third side SL3 toward the fourth side SL4) may extend to the region between the dummy lead wire DL and the second target lead wire TLt, so as to increase the length.

The second type of lead wire RL2 is located on the side of the first type of lead wire RL1 away from the touch-control region TA, that is, on the outer side of the first type of lead wire RL1. The narrowing portion RLs is provided on the second type of lead wire RL2. The second type of lead wires RL2 may include a plurality of first lead wires RL, and the specific number is not particularly limited here. Each first lead wire RL in the second type of lead wire RL2 may be provided with at least one narrowing portion RLs.

The third type of lead wire RL3 is located on the side of the second type of lead wire RL2 away from the touch-control region TA, that is, on the outer side of the second type of lead wire RL2. The length of the third type of lead wire RL3 is greater than the length of the second type of lead wire RL2, and is greater than or equal to the length of the first type of lead wire RL1. Since the resistance of the first type of lead wire RL1 may be increased by winding, the resistance of the second type of lead wire RL2 may be increased through the narrowing the portion RLs without increasing the length. Therefore, the length of the first type of lead wire RL1 may be greater than the length of the second type of lead wire RL2. The number of the third type of lead wire RL3 may be only one; that is, the third type of lead wire RL3 is the outermost first lead wire RL among all the first lead wires RL, which has the longest length and the largest resistance. The resistance of this first lead wire RL may be used as a standard value, the resistance of the second type of lead wire RL2 may be made consistent with the standard value through the narrowing portion RLs, and the resistance of the first type of lead wire RL1 may be made consistent with the standard value by winding.

In some embodiments of the present disclosure, the first type of lead wire RL1 may adopt the structure of the narrowing portion RLs above on the basis of adopting the above winding method. That is, the same first type of lead wire RL1 is both provided with a part extending along the first direction X, and a fracture FR and a contact hole Ho, so as to further increase the resistance. The second type of lead wire RL2 may only be provided with a narrowing portion RLs. In some embodiments, if space permits, winding may also be performed on the second type of lead wire RL2.

It should be noted that due to possible errors in the manufacturing and testing processes, there may be still a certain deviation in the resistances of the first lead wires RL after providing the narrowing portion RLs or winding, however, the resistances may still be regarded as equal to each other, as long as the deviation is within a specified threshold. For example, the difference between the resistance of any first type of lead wire RL1 or second type of lead wire RL2 and the above-mentioned standard value is less than 5% of the standard value.

Figure 16:
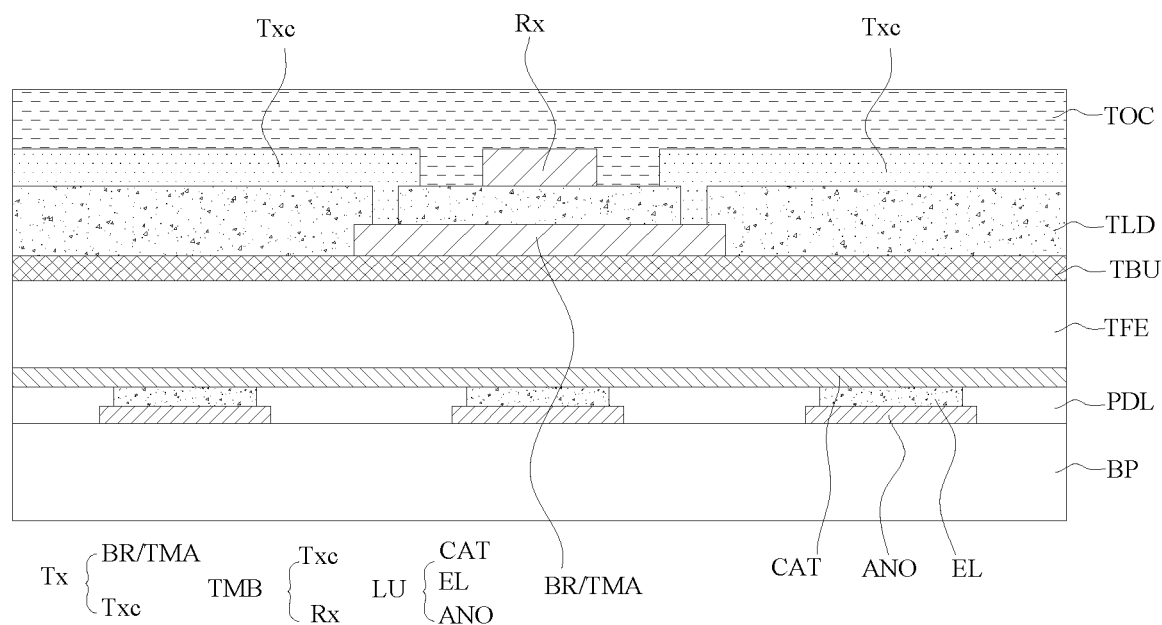
FIG. 16 is a local cross section view of a touch-control display panel according to of some embodiments of the present disclosure.

As shown in FIG. 16, according to some embodiments of the present disclosure, there is provided a touch-control display panel, which may include a display substrate and the touch-control structure according to any one of the above embodiments, and the touch-control structure may be provided on a side of the display substrate. On the basis that the touch-control structure is provided with a touch-control region and a peripheral region, correspondingly, the touch-control display panel is also provided with a touch-control region and a peripheral region. Specifically, the touch-control region of the touch-control display panel is the region corresponding to the touch-control region of the touch-control structure. The peripheral region of the touch-control display panel is the region corresponding to the peripheral region of the touch-control structure. Correspondingly, the peripheral region of the touch-control display panel is also provided with an edge region and a lead-out region, the lead-out region is also provided with a binding portion, and the binding portion corresponds to the binding portion of the touch-control structure. Therefore, the top view of the touch-control display panel may be referred to FIG. 1 to FIG. 4. The driving circuit of the display substrate may be connected to the binding portion of the touch-control display panel, and the lead wires of the touch-control structure are also connected to the binding portion. The binding portion of the touch-control display panel may be connected to a flexible circuit board, and the flexible circuit board may be connected to the driving circuit board, so that the touch-control display panel may be controlled to emit light through the driving circuit board. In addition, in some embodiments, the lead-out region of the touch-control display panel is also provided with a bending region SA. The bending region may cause the lead-out region to bend toward the side of the display substrate away from the touch-control structure, so as to be connected to the flexible circuit board on the back side of the display substrate. In some embodiments, in some embodiments, the bending region SA may not be provided, and the flexible circuit board may be bent to the back side of the display substrate.

The display substrate may be an electro-organic light-emitting display substrate, a liquid crystal display substrate, etc., and its structure is not specifically limited here. Taking the electro-organic light-emitting display substrate as an example, it may include a driving backplane BP, a plurality of light-emitting devices LU and an encapsulation layer TFE.

The light-emitting devices LU may be distributed on a side of the driving backplane BP in an array, and the encapsulation layer TFE covers the light-emitting devices LU.

The driving backplane BP is provided with a driving circuit, which may be used to drive each light-emitting device LU to emit light independently, so as to display an image. The driving circuit may include a pixel circuit and a peripheral circuit, and at least a part of the pixel circuit is located within the pixel region. In some embodiments, it is possible that partial region of a part of the pixel circuit is located in the peripheral region WA. The pixel circuit may have a structure such as 7T1C, 7T2C, 6T1C or 6T2C, as long as it can drive the light-emitting device LU to emit light, and the structure of the pixel circuit is not specifically limited here. The number of the pixel circuits is the same as the number of light-emitting devices LU, and the pixel circuits are connected to the various light-emitting device LU in one-to-one correspondence, so as to control each light-emitting device LU to emit light independently. Among them, nTmC means that a pixel circuit includes n transistors (indicated by the letter "T") and m capacitors (indicated by the letter "C").

The peripheral circuit is located within the peripheral region WA, and is connected to the pixel circuit for inputting driving signals to the pixel circuit, so as to control the light-emitting device LU to emit light. The peripheral circuit may include a gate driving circuit, a source driving circuit, a light-emitting control circuit, etc. In some embodiments, the peripheral circuit may also include other circuits. The specific structure of the peripheral circuit is not specifically limited here.

In order to separate the light-emitting devices LU and prevent crosstalk, the touch-control display panel may also include a pixel definition layer PDL that defines each light-emitting device LU. The pixel definition layer PDL may be provided on a side of the driving backplane BP, and the pixel definition layer PDL may be provided with a plurality of openings. The range defined by each opening is the range of a light-emitting device LU. The shape of the opening, that is, the shape of the outline of the orthographic projection of the opening on the driving backplane BP, may be a polygon, a smooth closed curve, or other shapes. The smooth closed curve may be a circle, an ellipse, or a closed shape with a rectangular in the middle and two semi-circles at two ends, etc., which is not specifically limited here.

The light-emitting device LU may be located within the touch-control region TA. Taking the light-emitting device LU using an organic light-emitting diode as an example, it may include a first electrode ANO, a light-emitting function layer EL and a second electrode CAT sequentially stacked along the direction away from the driving backplane BP.

The first electrode ANO may be provided on the same surface of the driving backplane BP as the pixel definition layer PDL, and may serve as the anode of the light-emitting device LU. Each opening of the pixel definition layer PDL exposes each first electrode ANO in one-to-one correspondence. The first electrode ANO may have a single-layer or multi-layer structure, and the material of the first electrode ANO may include one or more of a conductive metal, a metal oxide, and an alloy.

The light-emitting function layer EL is at least partially provided within the opening, and may include a hole injection layer, a hole transport layer, a luminescent material layer, an electron transport layer and an electron injection layer sequentially stacked along the direction away from the driving backplane BP. Visible light may be generated by combining the holes and electrons into excitons in the luminescent material layer and radiating photons by the excitons. The specific luminescence principle will not be described in detail here.

The second electrode CAT may cover the light-emitting function layer EL, which may serve as the cathode of the light-emitting device LU. The second electrode CAT may have a single-layer or multi-layer structure, and the material of the second electrode CAT may include one or more of a conductive metal, a metal oxide, and an alloy.

Furthermore, each light-emitting device LU may share a same second electrode CAT. Specifically, the second electrode CAT is a continuous conductive layer covering the pixel definition layer PDL and the light-emitting function layer EL of each light-emitting device LU. That is to say, the orthographic projection of the second electrode CAT on the pixel definition layer PDL covers each opening.

The encapsulation layer TFE may cover the light-emitting device LU, and may be used to block external water and oxygen from corroding the light-emitting device LU. For example, the encapsulation layer TFE may be used to realize encapsulation by using the manner of thin film encapsulation, which may include a first inorganic layer, an organic layer and a second inorganic layer, where the first inorganic layer covers the light-emitting device LU, for example, the first inorganic layer may cover the second electrode CAT. The organic layer may be provided on the surface of the first inorganic layer away from the driving backplane BP, and the boundary of the organic layer is limited to the inside of the boundary of the first inorganic layer. The boundary of the orthographic projection of the organic layer on the driving backplane BP may be located in the peripheral region WA, ensuring that the organic layer can cover each light-emitting device LU. The second inorganic layer may cover the organic layer and the first inorganic layer that is not covered by the organic layer. It may block the intrusion of water and oxygen through the second inorganic layer, and achieve planarization through the flexible organic layer.

The touch-control structure may be provided on the side of the encapsulation layer TFE away from the driving backplane BP. For example, a buffer layer TBU may be provided on the surface of the encapsulating layer TFE away from the driving backplane BP. The specific structure of the touch-control structure may be referred to the above embodiments of the touch-control structure, which will not be described again here.

According to the present disclosure, there is further provided a touch-control display panel, which may include a driving backplane, a light-emitting device, an encapsulation layer and a touch-control structure.

The driving backplane, the light-emitting device and the encapsulation layer are sequentially formed on a side of the driving backplane. The specific structures of the driving backplane, the light-emitting device and the encapsulation layer may be referred to the driving backplane, the light-emitting device and the encapsulation layer in the above embodiments, which will not be described in detail here.

The touch-control structure may be divided into at least a touch-control region and a peripheral region. The peripheral region is located outside the touch-control region. The peripheral region may include an edge region surrounding the touch-control region and a lead-out region extending outward from a part of the edge region. The lead-out region is provided with a binding portion.

The touch-control structure may include touch-control electrodes located in the touch-control region and lead wires located in the peripheral region, and each touch-control electrode is connected to the binding portion through at least one lead wire to transmit signals. The touch-control electrodes may include a plurality of first touch-control electrodes and a plurality of second touch-control electrodes. The first touch-control electrodes extend along the first direction and are distributed at intervals along the second direction; the second touch-control electrodes extend along the second direction, and are distributed at intervals along the first direction. The first direction is intersected with the second direction. The first touch-control electrodes are insulated from the second touch-control electrodes.

Various lead wires include a plurality of first lead wires and a plurality of second lead wires. The first touch-control electrode is connected to the binding portion through the first lead wire, and the second touch-control electrode is connected to the binding portion through the second lead wire.

At least one lead wire includes a first wire body and a second wire body. The orthographic projections of the first wire body and the second wire body of the same lead wire on the driving backplane overlap with each other and are connected in parallel; that is, the first wire body and the second wire body may be distributed along the direction away from or close to the driving backplane, and the orthographic projections of the two on the driving backplane at least partially overlap with each other. At the same time, the first wire body and the second wire body are connected to each other at least in two positions to achieve connection in parallel.

The first wire body may include at least one discontinuous portion, and the discontinuous portion is an opening that disconnects the first wire body, which may divide the first wire body into a plurality of first lead wire sub-portions.

The second wire body may include at least one continuous lead wire sub-portion, and the orthographic projection of the continuous lead wire sub-portion on the driving backplane is a continuous structure; that is, the continuous lead wire sub-portion is provided with no discontinuous portion, and extends continuously without discontinuity. At the same time, the orthographic projections of the discontinuous portion of the first wire body and the continuous lead wire sub-portion on the driving backplane overlap with each other.

The connection between the touch-control electrode and the binding portion may be realized through the first wire body and the second wire body. At the same time, since the first wire body is provided with a discontinuous portion, and the first wire body and the second wire body are connected in parallel, the cross section of the lead wire may be reduced at the discontinuous portion, thus increasing the resistance.

In a case that the lead wire is relatively short, the resistance may also be increased, which is beneficial to improving the uniformity of resistance of lead wires of different lengths by providing the discontinuous portion.

In some embodiments of the present disclosure, the plurality of lead wires may include a first type of lead wires and a second type of lead wires distributed in the peripheral region along the direction away from the touch-control region. The length of the first type of lead wire is greater than or equal to the length of the second type of lead wire. The distribution manner of the first type of lead wires and the second type of lead wires may be referred to that of the first type of lead wires and the second type of lead wires above, and will not be described in detail here.

The second type of lead wire may include the above-mentioned first wire body and second wire body. The first type of lead wire may include a third wire body and a fourth wire body connected in parallel. The third wire body and the fourth wire body may be provided in different layers along the direction away from or close to the driving backplane. The orthographic projections of the third wire body and the fourth wire body on the driving backplane are continuous structures, and the orthographic projections overlap with each other, so that the second type of lead wires at least has a double-layer structure, which is beneficial to reducing resistance and signal attenuation.

In some embodiments of the present disclosure, based on the first type of lead wires and the second type of lead wires, the plurality of lead wires also includes a third type of lead wires. The third type of lead wires are provided on a side of the second type of lead wires away from the touch-control region. The length of the third type of lead wire is greater than or equal to the length of the second type of lead wire. The third type of lead wire may include a fifth wire body and a sixth wire body connected in parallel. The fifth wire body and the sixth wire body may be provided in different layers along the direction away from or close to the driving backplane. The orthographic projections of the fifth wire body and the sixth wire body on the driving backplane are continuous structures, and the orthographic projections overlap with each other, so that the third type of lead wire at least has a double-layer structure, which is beneficial to reducing resistance and signal attenuation.

According to the present disclosure, there is further provided a display apparatus, which may include the touch-control display panel according to any one of the above embodiments. The specific structure and beneficial effects of the touch-control display panel may be referred to the above embodiments of the touch-control structure and the touch-control display panel, which will not be described in detail here. The display apparatus of the present disclosure may be an electronic device with a touch-control display function such as a mobile phone or a tablet computer, which will not be listed here.

Other embodiments of the present disclosure will be readily apparent to those skilled in the art from consideration of the description and practice of the present disclosure. The present disclosure is intended to cover any variations, uses, or adaptations of the present disclosure that follow the general principles of the present disclosure and include common knowledge or conventional technical means in the technical field that are not disclosed in the present disclosure. The description and embodiments are considered as exemplary only, with a true scope and spirit of the present disclosure being indicated by the appended claims.

What is claimed is:

1. A touch-control structure, wherein the touch-control structure is provided with a touch-control region and a peripheral region outside the touch-control region, the peripheral region comprises an edge region surrounding the touch-control region and a lead-out region extending outward from a part of the edge region, and the lead-out region is provided with a binding portion; the touch-control structure comprises touch-control electrodes located in the touch-control region and lead wires located in the peripheral region, and the touch-control electrodes are connected to the binding portion through the lead wires;

the touch-control electrodes comprise a plurality of first touch-control electrodes and a plurality of second touch-control electrodes; the first touch-control electrodes extend along a first direction and are distributed at intervals along a second direction;

the second touch-control electrodes extend along the second direction and are distributed at intervals along the first direction; the first direction is intersected with the second direction; the first touch-control electrodes are insulated from the second touch-control electrodes; the lead wires comprise a plurality of first lead wires and a plurality of second lead wires; the first touch-control electrodes are connected to the binding portion through the first lead wires, and the second touch-control electrodes are connected to the binding portion through the second lead wires;

at least a part of the first lead wires comprises main body portions and narrowing portions connected to each other along an extension path of the first lead wires, and a cross section of at least a part of the narrowing portions is smaller than a cross section of the main body portions;

wherein the lead wires comprise a plurality of layers of wire bodies provided at intervals, and the wire bodies of a same lead wire overlap with each other;

a part of the wire bodies of at least a part of the first lead wires is provided with a fracture;

wire bodies cut off by the fracture comprises a plurality of wire segments separated by the fracture, and the wire segments are all connected to adjacent wire bodies through contact holes, so as to connect the wire bodies cut off by the fracture to adjacent wire bodies in parallel;

a part of the first lead wires corresponding to the wire segments is the main body portions; and a part of the first lead wires between two contact holes connected to two ends of a same fracture is the narrowing portions.

2. The touch-control structure according to claim 1, wherein the touch-control structure further comprises dummy wire bodies, the dummy wire bodies are located within the fracture, and the dummy wire bodies are provided at a same layer as the wire bodies where the fracture is located, and are connected floatingly to the wire bodies where the fracture is located.

3. The touch-control structure according to claim 1, wherein a distance between a contact hole and a fracture closest to the contact hole is greater than a length of the fracture.

4. The touch-control structure according to claim 1, wherein a distance between a contact hole and a fracture closest to the contact hole is less than or equal to a length of the fracture.

5. The touch-control structure according to claim 1, wherein at least two first lead wires with different lengths are provided with narrowing portions; among two first lead wires with different lengths, a length of a narrowing portion of a first lead wire with a greater length is smaller than a length of a narrowing portion of the first lead wire with a smaller length.

6. The touch-control structure according to claim 1, wherein the narrowing portions are all located in the edge region, and a distance between each of the narrowing portions and the lead-out region in the second direction is equal to each other.

7. The touch-control structure according to claim 1, wherein the narrowing portions are all located in the edge region; a distance between each of the narrowing portions and the lead-out region in the second direction is increased or decreased along a direction away from the touch-control region.

8. The touch-control structure according to claim 1, wherein the lead-out region and the touch-control region are distributed along the second direction; each of the first lead wires is connected to the first touch-control electrodes from a same side of the touch-control region, and is distributed at intervals along a direction away from the touch-control region;
each of the first lead wires is classified into a first type of lead wire, a second type of lead wire or a third type of lead wire distributed along the direction away from the touch-control region; a partial region of the first type of lead wire extends along the first direction between the touch-control region and the lead-out region; the narrowing portions are provided at the second type of lead wire; a length of the third type of lead wire is greater than a length of the second type of lead wire, and is greater than or equal to a length of the first type of lead wire.

9. The touch-control structure according to claim 1, wherein the lead-out region and the touch-control region are distributed along the second direction; each of the first lead wires is connected to the first touch-control electrodes from a same side of the touch-control region, and is distributed at intervals along a direction away from the touch-control region;
each of the first lead wires is classified into a first type of lead wire, a second type of lead wire or a third type of lead wire distributed in the direction away from the touch-control region; a partial region of the first type of lead wire extends along the first direction between the touch-control region and the lead-out region; the narrowing portions are provided at the first type of lead wire and the second type of lead wire; a length of the third type of lead wire is greater than a length of the second type of lead wire, and is greater than or equal to a length of the first type of lead wire.

10. The touch-control structure according to claim 1, wherein the lead-out region and the touch-control region are distributed along the second direction; each of the first lead wires is connected to the first touch-control electrodes from a same side of the touch-control region, and is distributed at intervals along a direction away from the touch-control region; the second lead wires are located between the touch-control region and the binding portion; and
at least one of the first lead wires is intersected with and insulated from at least one of the second lead wires.

11. The touch-control structure according to claim 10, wherein an outline of the touch-control region comprises four sides and rounded corners connecting two adjacent sides; the sides comprise a first side and a second side extending along the first direction, as well as a third side and a fourth side extending along the second direction; the first side and the second side are distributed along a direction away from the lead-out region; the third side and the fourth side are distributed along the first direction; a rounded corner connecting the first side and the third side is a first rounded corner;
in the direction away from the lead-out region, a first one of the first touch-control electrodes is a first target electrode, an edge of the first target electrode close to the lead-out region is located at the first side, and an edge of the first target electrode away from an end of the fourth side is located at the first rounded corner; a first lead wire connected to the first target electrode is a first target lead wire;
in a direction extending away from the third side to the fourth side, a first one of the second touch-control electrodes is a second target electrode, and an edge of the second target electrode away from the fourth side is located at the third side, and an edge of the second target electrode close to an end of the lead-out region is located at the first rounded corner; a second lead wire connected to the second target electrode is a second target lead wire; and
the first target lead wire is intersected with and insulated from the second target lead wire.

12. The touch-control structure according to claim 11, wherein at least one isolation wire is provided between at least a local region of the first target lead wire and at least a local region of the second target lead wire; and
a dummy lead wire is provided between the at least one isolation wire and a local region of the second target lead wire.

13. The touch-control structure according to claim 1, wherein the wire bodies of the lead wires comprise a first wire body and a second wire body; a first touch-control electrode comprises a plurality of first electrode blocks connected in series along the first direction; a second touch-control electrode comprises a plurality of second electrode blocks distributed along the second direction and transfer bridges connecting two adjacent second electrode blocks; a transfer bridge is intersected with a first touch-control electrode; the transfer bridges are provided on a same layer as the first wire body; the first electrode blocks, the second electrode blocks and the second wire body are provided on a same layer.

14. The touch-control structure according to claim 13, wherein the touch-control structure comprises:
a first conductive layer, comprising the first wire body and the transfer bridges;
an insulating isolation layer, covering the first conductive layer; and
a second conductive layer, provided on a surface of the insulating isolation layer away from the first conductive layer, and comprising the first electrode blocks, the second electrode blocks and the second wire body.

15. The touch-control structure according to claim 10, wherein the lead wires further comprise a plurality of third lead wires; the second touch-control electrodes are further connected to the binding portion through the third lead wires; and an end of a third lead wire is connected to an end of a second touch-control electrode away from the lead-out region, and another end of the third lead wire is connected to the binding portion.

16. A touch-control display panel, comprising:
a display substrate; and
a touch-control structure, wherein the touch-control structure is provided with a touch-control region and a peripheral region outside the touch-control region, the peripheral region comprises an edge region surrounding the touch-control region and a lead-out region extending outward from a part of the edge region, and the lead-out region is provided with a binding portion; the touch-control structure comprises touch-control electrodes located in the touch-control region and lead wires located in the peripheral region, and the touch-control electrodes are connected to the binding portion through the lead wires; the touch-control electrodes comprise a plurality of first touch-control electrodes and a plurality of second touch-control electrodes; the first touch-control electrodes extend along a first direction and are distributed at intervals along a second direction; the second touch-control electrodes extend along the second direction and are distributed at intervals along the first direction; the first direction is intersected with the second direction; the first touch-control electrodes are insulated from the second touch-control electrodes; the lead wires comprise a plurality of first lead wires and a plurality of second lead wires; the first touch-control electrodes are connected to the binding portion through the first lead wires, and the second touch-control electrodes are connected to the binding portion through the second lead wires;

at least a part of the first lead wires comprises main body portions and narrowing portions connected to each other along an extension path of the first lead wires, and a cross section of at least a part of the narrowing portions is smaller than a cross section of the main body portions;

wherein the lead wires comprise a plurality of layers of wire bodies provided at intervals, and the wire bodies of a same lead wire overlap with each other; a part of the wire bodies of at least a part of the first lead wires is provided with a fracture;

wire bodies cut off by the fracture comprises a plurality of wire segments separated by the fracture, and the wire segments are all connected to adjacent wire bodies through contact holes, so as to connect the wire bodies cut off by the fracture to adjacent wire bodies in parallel;

a part of the first lead wires corresponding to the wire segments is the main body portions; and a part of the first lead wires between two contact holes connected to two ends of a same fracture is the narrowing portions.

* * * * *